(12) United States Patent
Hess et al.

(10) Patent No.: US 10,753,383 B2
(45) Date of Patent: *Aug. 25, 2020

(54) SPRING-LOADED NUT PLATE

(71) Applicant: Enduralock, LLC., Overland Park, KS (US)

(72) Inventors: Harold Hess, Leawood, KS (US); Armando Perez, III, Los Angeles, CA (US); Zoltan Kalman Furu-Szekely, Cypress, TX (US)

(73) Assignee: Enduralock, LLC, Lenexa, KS (US)

( * ) Notice: Subject to any disclaimer, the term of this patent is extended or adjusted under 35 U.S.C. 154(b) by 301 days.

This patent is subject to a terminal disclaimer.

(21) Appl. No.: 15/678,927

(22) Filed: Aug. 16, 2017

(65) Prior Publication Data
US 2018/0252256 A1 Sep. 6, 2018

Related U.S. Application Data

(60) Provisional application No. 62/465,997, filed on Mar. 2, 2017.

(51) Int. Cl.
*F16B 39/284* (2006.01)
*F16B 37/04* (2006.01)
*F16B 39/10* (2006.01)
F16B 37/06 (2006.01)

(52) U.S. Cl.
CPC ............ *F16B 37/044* (2013.01); *F16B 39/10* (2013.01); *F16B 37/064* (2013.01)

(58) Field of Classification Search
CPC .............................. F16B 37/044; F16B 37/046

USPC .......................................... 411/103, 108, 109
See application file for complete search history.

(56) References Cited

U.S. PATENT DOCUMENTS

| 2,353,252 | A | * | 7/1944 | Leisure ................. | F16B 37/044 |
| | | | | | 411/111 |
| 2,385,851 | A | * | 10/1945 | Swanstrom ............ | F16B 39/34 |
| | | | | | 411/103 |
| 2,737,222 | A | * | 3/1956 | Becker .................. | F16B 5/0208 |
| | | | | | 411/105 |
| 2,991,816 | A | | 7/1961 | Harbison et al. | |
| 3,160,187 | A | * | 12/1964 | Zahofiakin .......... | F16B 37/0857 |
| | | | | | 411/267 |
| 3,219,086 | A | | 11/1965 | Zahodiakin | |
| 3,426,816 | A | * | 2/1969 | McIntire, Jr. ........... | F16B 37/00 |
| | | | | | 411/108 |
| 3,695,324 | A | | 10/1972 | Gulistan | |

(Continued)

OTHER PUBLICATIONS

PCT International Search Report and Written Opinion, Application No. PCT/US2018/019325, dated May 2, 2018, 10 pps.

*Primary Examiner* — Gary W Estremsky
(74) *Attorney, Agent, or Firm* — Armstrong Teasdale LLP

(57) ABSTRACT

A nut plate assembly includes a plate member, a shell member, a nut, and a bias member. The plate member includes a retention tab. The shell member includes a first end coupled to the plate member by the retention tab and a second end opposite the first end. The nut is disposed within the shell member and is moveable between a first position proximate the shell member first end and a second position proximate the shell member second end. In addition, the bias member is disposed within the shell member and is configured to bias the nut toward one of the first position and the second position.

29 Claims, 22 Drawing Sheets

(56) References Cited

U.S. PATENT DOCUMENTS

| | | | |
|---|---|---|---|
| 4,191,236 A * | 3/1980 | Duran | F16B 39/10 |
| | | | 411/105 |
| 4,227,561 A * | 10/1980 | Molina | F16B 37/044 |
| | | | 411/103 |
| 4,692,075 A | 9/1987 | Metz | |
| 4,863,326 A | 9/1989 | Vickers | |
| 4,875,816 A | 10/1989 | Peterson | |
| 4,917,553 A | 4/1990 | Muller | |
| 5,146,668 A | 9/1992 | Gulistan | |
| 5,489,173 A * | 2/1996 | Hofle | F16B 37/046 |
| | | | 411/85 |
| 5,716,178 A | 2/1998 | Vu | |
| 5,730,540 A * | 3/1998 | Duran | F16B 5/0208 |
| | | | 403/21 |
| 6,183,180 B1 * | 2/2001 | Copple | F16B 37/044 |
| | | | 411/107 |
| 7,544,028 B2 * | 6/2009 | Tournier | F16B 37/046 |
| | | | 411/121 |
| 7,698,798 B2 | 4/2010 | Toosky | |
| 7,802,952 B2 | 9/2010 | Toosky et al. | |
| 8,177,466 B2 | 5/2012 | Csik et al. | |
| 8,277,158 B2 * | 10/2012 | Csik | F16B 37/046 |
| | | | 411/111 |
| 8,579,569 B2 | 11/2013 | Schendel | |
| 8,647,035 B2 * | 2/2014 | Bakken | F16B 17/006 |
| | | | 411/108 |
| 9,033,632 B2 | 5/2015 | Komsitsky et al. | |
| 9,114,449 B2 | 8/2015 | Ross et al. | |
| 9,140,290 B2 | 9/2015 | Damm | |
| 9,360,039 B2 | 6/2016 | Endt et al. | |
| 9,435,369 B2 | 9/2016 | Deck | |
| 2003/0147715 A1 | 8/2003 | Curley et al. | |

* cited by examiner

SPRING-LOADED NUT PLATE

CROSS REFERENCE TO RELATED APPLICATIONS

This application claims priority to U.S. Provisional Patent Application No. 62/465,997 filed Mar. 2, 2017, which is incorporated herein by reference in its entirety.

BACKGROUND

The field of the disclosure relates generally to nut plates, and more specifically to nut plates including a spring-loaded nut.

At least some known floating nut plates include a base or bottom plate with an opening and support a nut or similar fastener element that is captured on the base by a retainer or cage component. Such nut plates facilitate holding components, for example panels, together when a fastener is threadably engaged with the nut plate and tightened, while still enabling some movement between the components. In such known nut plates, the nut receives a fastener, such as a bolt, screw, or other threaded component element passed through an opening in the components and threaded into the nut. The opening in the component may be sized to enable the nut and fastener to move laterally to accommodate some movement between the fastened components.

At least some known floating nut plates may be used in the aerospace industry. In aerospace applications, the types and numbers of fasteners for a panel assembly can be significant. Some panel fasteners for a particular panel assembly may have different lengths, while otherwise looking similar to other panel fasteners. When the panel assembly is removed, a user may typically place all the panel fasteners in a separate location to keep from misplacing the fasteners. However, when replacing the panel assembly, the user may inadvertently use an incorrect length fastener for a particular panel fastener location. This can lead to an improperly attached panel assembly.

BRIEF DESCRIPTION

In one aspect, a nut plate assembly is provided. The nut plate assembly includes a plate member including a retention tab. The nut plate assembly also includes a shell member having a first end coupled to the plate member by the retention tab and a second end opposite the first end. In addition, the nut plate includes a nut disposed within the shell member. The nut is moveable between a first position proximate the shell member first end and a second position proximate the shell member second end. Moreover, the nut plate assembly includes a bias member disposed within the shell member. The bias member is configured to bias the nut toward one of the first position and the second position.

In another aspect, a nut plate assembly is provided. The nut plate assembly includes a plate member including an aperture defined therethrough. The nut plate assembly includes a shell member having a cylindrical wall and having a first end coupled to the plate member and a second end opposite the first end. In addition, the nut plate assembly includes a bias member disposed within the shell member. Moreover, the nut plate assembly includes a nut including a shoulder portion configured to receive a portion of the bias member. The nut is disposed within the shell member and moveable between a first position proximate the shell member first end and a second position proximate the shell member second end. The bias member is configured to bias the nut toward one of the first position and the second position.

In yet another aspect, a fastener assembly is provided. The fastener assembly includes a nut plate assembly adapted for mounting to a mounting structure. The nut plate assembly includes a plate member, a shell member having a first end coupled to the plate member and a second end opposite the first end, a nut, and a bias member. The nut is disposed within the shell member. The nut is moveable between a first position proximate the shell member first end and a second position proximate the shell member second end. The bias member is disposed within the shell member and is configured to bias the nut toward one of the first position and the second position. The fastener assembly also includes a fastener configured to mount in an aperture formed in a panel member. The fastener includes a locking mechanism for retaining the fastener in the aperture. The fastener is threadably engageable with the nut for coupling the panel member to the mounting structure.

In still another aspect, a nut plate assembly is provided. The nut plate assembly includes a plate member and a shell member including a first end and a second end opposite the first end. The nut plate assembly also includes a retention member configured to couple the shell member to the plate member. The retention member is positionable between a first position and a second position. The retention member is configured to engage the plate member when the retention member is in the first position. The nut plate assembly further includes a nut disposed within the shell member. The nut is moveable between a first position proximate the shell member first end and a second position proximate the shell member second end. The nut plate assembly also includes a bias member disposed within the shell member. The bias member is configured to bias the nut toward one of the first position and the second position.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
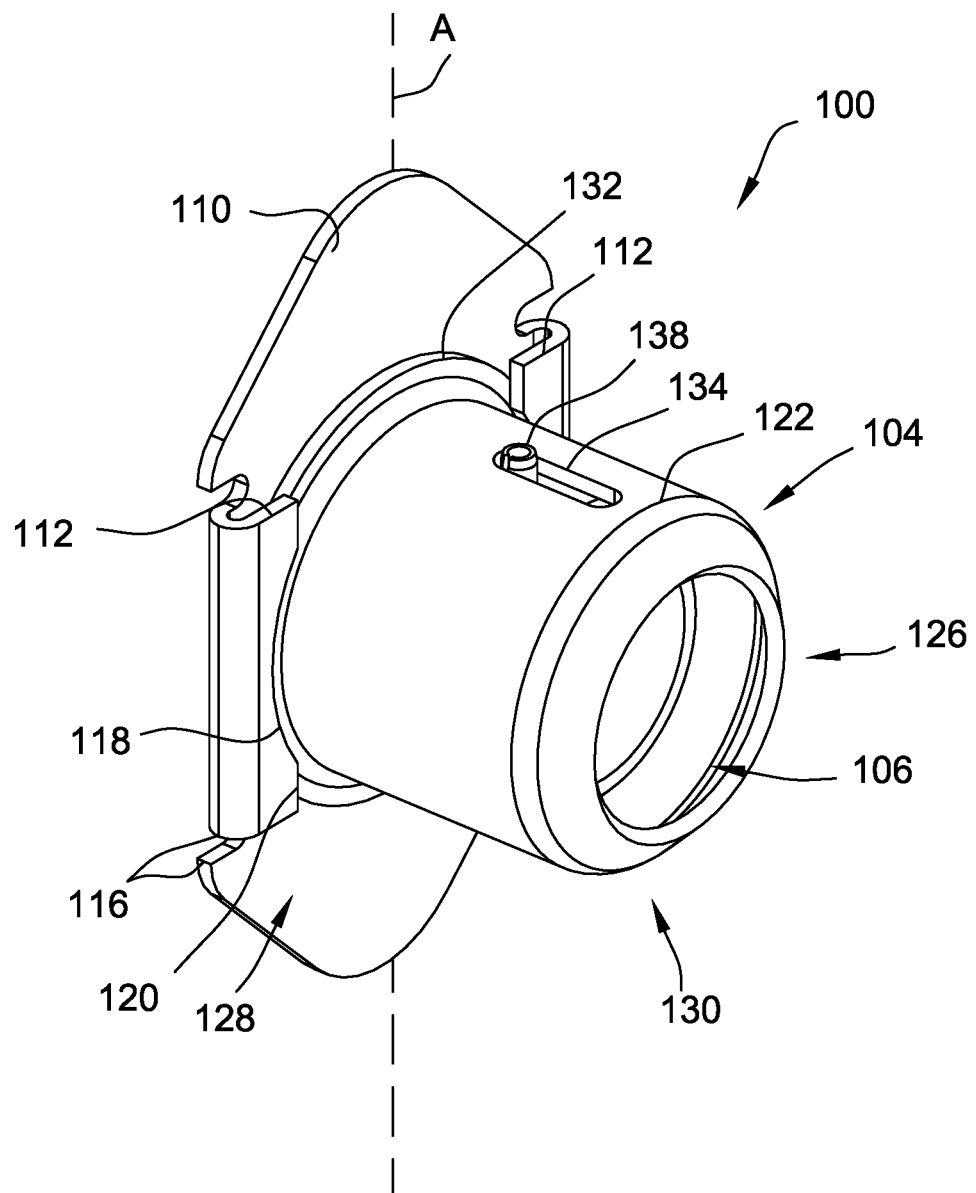
FIG. 1 is a perspective view of a spring-loaded nut plate assembly.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms such as "about," "approximately," and "substantially" are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

Relative descriptors used herein such as upward, downward, left, right, up, down, length, height, width, thickness, and the like are with reference to the figures, and not meant in a limiting sense. Additionally, the illustrated embodiments can be understood as providing exemplary features of varying detail of certain embodiments, and therefore, features, components, modules, elements, and/or aspects of the illustrations can be otherwise combined, interconnected, sequenced, separated, interchanged, positioned, and/or rearranged without materially departing from the disclosed fastener assemblies. Additionally, the shapes and sizes of components are also exemplary and can be altered without materially affecting or limiting the disclosed technology.

The nut plate assemblies described herein overcome many of the problems associated with nut plate assemblies. In general, nut plate assemblies are used to fixedly connect panels to structures in a variety of applications such as, without limitation, aerospace applications, industrial applications, and building applications, where access to both sides of the nut plate assembly is limited or restricted. Among other features and benefits, the disclosed nut plate assemblies facilitate one or more of the use of captive panel fasteners having varying lengths, quick and easy installation and/or removal of panel fasteners, and/or single end access for blind fastening applications. The advantages, and other features of the technology disclosed herein, will become more readily apparent to those having ordinary skill in the art from the following detailed description of certain preferred embodiments taken in conjunction with the drawings.

Figure 2:
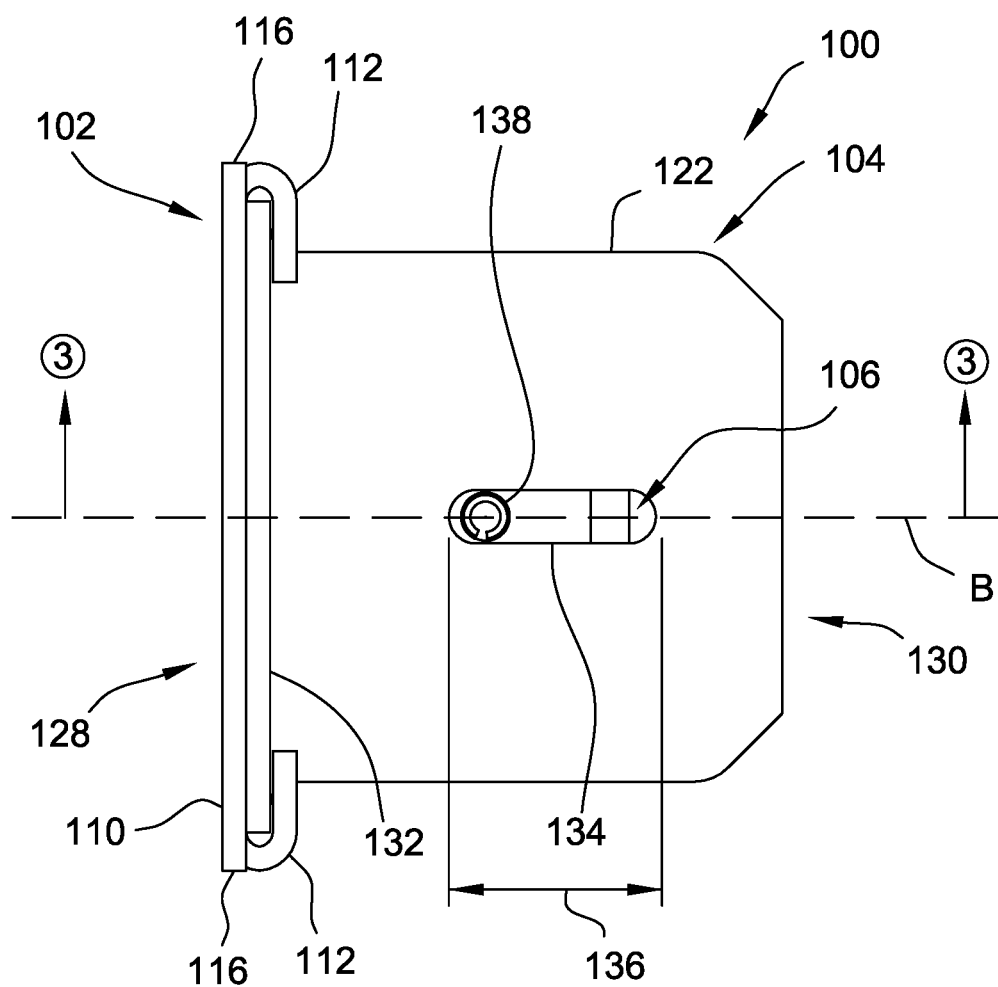
FIG. 2 is a top view of the nut plate assembly shown in FIG. 1.
Figure 3:
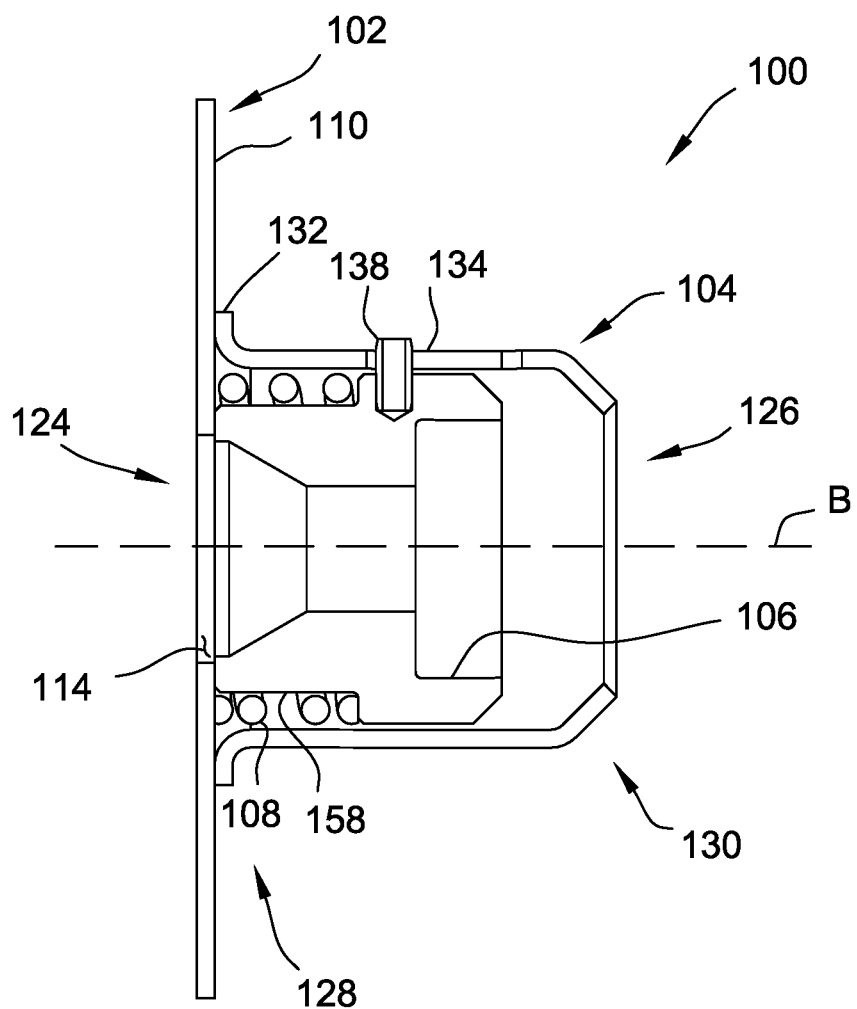
FIG. 3 is a cross-sectional view of the nut plate assembly shown in FIG. 2, taken about line 3-3 shown in FIG. 2.

FIG. 1 is a perspective view of a spring-loaded nut plate assembly 100. FIG. 2 is a top view of nut plate assembly 100. FIG. 3 is a cross-sectional view of nut plate assembly 100, taken about line 3-3 shown in FIG. 2. In the exemplary embodiment, nut plate assembly 100 includes a plate member 102, a shell member 104, a floating nut, broadly a nut, 106, and a bias member 108. Plate member 102 includes a wall portion 110 and a plurality of retention tabs 112 integrally formed with wall portion 110. Wall portion 110 includes an aperture 114 defined therethrough for receiving a fastener. Retention tabs 112, prior to coupling shell member 104 to plate member 102, lie in a plane of wall portion 110. In another embodiment, retention tabs 112 may be folded or bent perpendicular to wall portion 110. During assembly of nut plate assembly 100, retention tabs 112 are curled or bent along a respective edge 116 of plate member 102 to facilitate coupling shell member 104 to plate member 102. Each retention tab 112 has a semi-circular cutout 118 defined on an edge 120 of each retention tab 112.

In the exemplary embodiment, shell member 104 includes a substantially cylindrical wall 122 that defines a first opening 124 at a first end 128 and a second opening 126 at a second end 130 of shell member 104. First opening 124 and second opening 126 are generally concentric with each other. Shell member 104 includes a flange 132 formed at first end 128. At second end 130, cylindrical wall 122 tapers radially inward, e.g., by a swaging process, to facilitate retaining floating nut 106 within shell member 104 when shell member 104 is coupled to plate member 102.

Also, in the exemplary embodiment, floating nut 106 is disposed within shell member 104 and is moveable relative to cylindrical wall 122. For example, floating nut 106 is moveable along a central axis of shell member 104 between a first position and a second position. In the first position, floating nut 106 is proximate first end 128. In the second position, floating nut 106 is proximate second end 130. In alternative embodiments, floating nut 106 is moveable in any manner that enables nut plate assembly 100 to operate as described herein.

In the exemplary embodiment, shell member 104 includes a longitudinal slot 134 defined through cylindrical wall 122. Longitudinal slot 134 extends substantially axially along a centerline "B" of shell member 104 a predetermined length 136. Longitudinal slot 134 is sized and shaped to receive an anti-rotation pin 138 therethrough. In particular, anti-rotation pin 138 is coupled to floating nut 106 and extends through longitudinal slot 134 to facilitate preventing rotation of floating nut 106 while enabling axial movement during use of nut plate assembly 100. In the exemplary embodiment, anti-rotation pin 138 is a spring pin. Alternatively, anti-rotation pin 138 may be any type of anti-rotation mechanism that secures floating nut 106 as described herein, including for example, and without limitation, a dowel pin and/or a threaded fastener.

In the exemplary embodiment, bias member 108 is positioned within shell member 104 and between plate member 102 and floating nut 106. As such, bias member 108 facilitates biasing floating nut 106 axially away from plate member 102 and towards the second position. During use of nut plate assembly 100, bias member 108 facilitates pulling the attaching structure together as a fastener (not shown in FIGS. 1-3) is coupled with floating nut 106. Bias member 108 may function as a damping element and facilitates providing a pre-load force to a fastened joint. In the exemplary embodiment, bias member 108 is a compression spring. Alternatively, bias member 108 may be any type of bias or force provider that enables nut plate assembly 100 to function as described herein. The pre-load force on floating nut 106 may be adjusted by varying the wire diameter and spring length of bias member 108. In the exemplary embodiment, the wire diameter and spring length of bias member 108 is selected to provide the necessary pre-load required for operation of nut plate assembly 100, while maintaining bias member 108 in an axial resiliency range.

Figure 4:
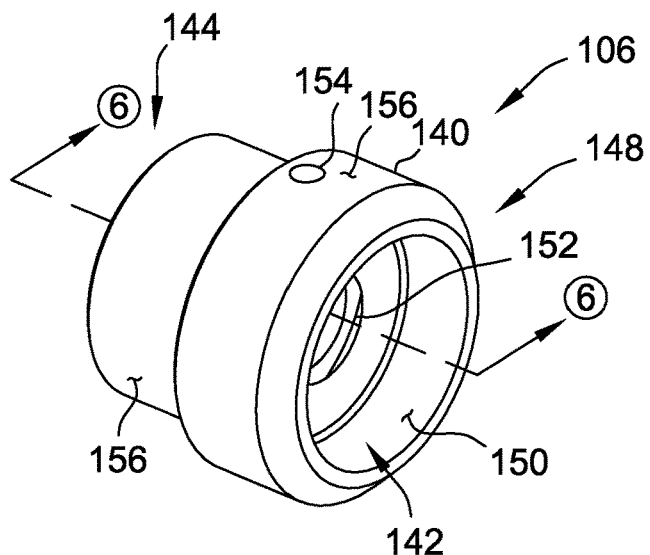
FIG. 4 is a perspective view of a floating nut for use with nut plate assembly shown in FIG. 1.
Figure 5:
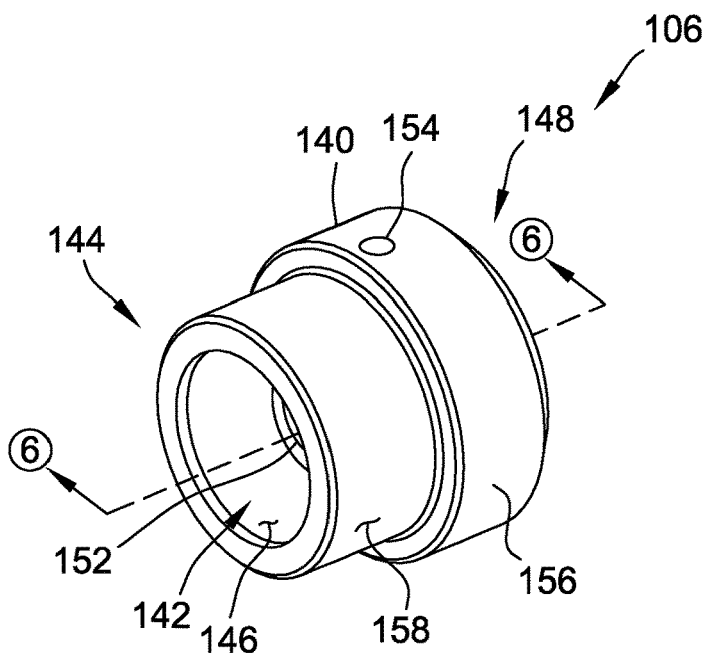
FIG. 5 is another perspective view of the floating nut shown in FIG. 4.
Figure 6:
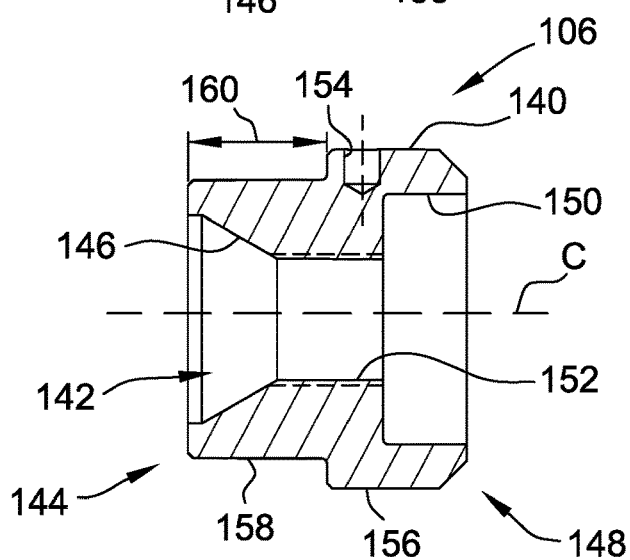
FIG. 6 is a cross-sectional view of the floating nut shown in FIG. 4, taken about line 6-6 shown in FIGS. 4 and 5.

FIG. 4 is a perspective view of floating nut 106 for use with nut plate assembly 100 (shown in FIG. 1). FIG. 5 is another perspective view of floating nut 106. FIG. 6 is a cross-sectional view of floating nut 106 taken about line 6-6 shown in FIGS. 4 and 5. In the exemplary embodiment, floating nut 106 has a substantially cylindrical body 140 that defines a bore 142 therethrough. At a first end 144 of cylindrical body 140, bore 142 includes a tapered portion 146 configured to facilitate aligning a fastener (not shown in FIGS. 4-6) with cylindrical body 140. At a second end 148 of cylindrical body 140, bore 142 includes a counter bored portion 150. Bore 142 includes a female threaded portion 152 extending between tapered portion 146 and counter bored portion 150 for threadably coupling to a fastener during use of nut plate assembly 100. In the exemplary embodiment, counter bored portion 150 functions as a way to control a length of female threaded portion 152 to facilitate maintaining a thread engagement length to about one times the thread diameter, while allowing the fastener to extend through female threaded portion 152. In addition, counter bored portion 150 facilitates fabricating cylindrical body 140 with a shoulder portion 158 having a length sufficient to prevent over-stressing and/or damaging bias member 108 while maintaining a thread engagement length to about one times the thread diameter, as described further herein.

Floating nut 106 includes a hole 154 defined in an outer surface 156 of cylindrical body 140. In particular, hole 154 is formed in outer surface 156 substantially perpendicular to centerline "C" of cylindrical body 140. In the exemplary embodiment, hole 154 extends a predetermined depth into cylindrical body 140, but does not extend through to bore 142. In alternative embodiments, hole 154 may extend any depth into cylindrical body 140, including, for example, entirely through cylindrical body 140. Hole 154 is sized and shaped to receive anti-rotation pin 138 therein. In particular, hole 154 is sized to form an interference fit with anti-rotation pin 138. As used herein, the phrase "interference fit" means a value of tightness between anti-rotation pin 138 and hole 154, i.e., an amount of radial clearance between the components. A negative amount of clearance is commonly referred to as a press fit, where the magnitude of interference determines whether the fit is a light interference fit or interference fit. A small amount of positive clearance is referred to as a loose or sliding fit. Alternatively, anti-rotation pin 138 may be coupled to cylindrical body 140 using any suitable fastening technique that enables nut plate assembly 100 to function as described herein. In the exemplary embodiment, an upper portion of anti-rotation pin 138 extends through longitudinal slot 134 to facilitate preventing rotation of floating nut 106 while enabling axial movement during use of nut plate assembly 100.

In the exemplary embodiment, floating nut 106 includes shoulder portion 158 extending from first end 144 axially along cylindrical body 140 a predetermined distance 160 that facilitates preventing over-stressing and/or damaging bias member 108 when bias member 108 is compressed, while enabling bias member 108 to urge cylindrical body 140 away from plate member 102 when extended. Shoulder portion 158 has a diameter that is smaller than the diameter of outer surface 156 of cylindrical body 140. In particular, shoulder portion 158 has a diameter configured to enable bias member 108 to slide onto shoulder portion 158, as shown in FIG. 3. Shoulder portion 158 enables bias member 108 to apply an axial force to cylindrical body 140 to urge cylindrical body 140 away from plate member 102, as described herein.

To assemble nut plate assembly 100, floating nut 106 is placed into shell member 104. Hole 154 of floating nut 106 is aligned with longitudinal slot 134. Anti-rotation pin 138 is press fit into hole 154 such that an end of anti-rotation pin 138 extends through longitudinal slot 134. Bias member 108 is placed about shoulder portion 158 of floating nut 106. First opening 124 of shell member 104 is substantially aligned with aperture 114 of plate member 102. Shell member 104 is pressed against plate member 102, thereby compressing bias member 108 within shell member 104. Retention tabs 112 are then curled or bent over flange 132 of shell member 104 to axially retain shell member 104 to plate member 102. As shown in FIG. 1, semi-circular cutouts 118 have a curvature that is greater than a diameter of cylindrical wall 122 of shell member 104, but less than a diameter of flange 132. This facilitates enabling shell member 104 to move a small amount along wall portion 110, while remaining in face to face contact with wall portion 110. As such, a fastener (not shown in FIG. 1) may be aligned with floating nut 106, which is retained in shell member 104, even if there is minor misalignment with the fastener and aperture 114 of plate member 102.

In the exemplary embodiment, nut plate assembly 100 is configured to retain both floating nut 106 and bias member 108 within shell member 104, which allows for nut plate assembly 100 to be used as an inseparable assembly. In addition, during use, nut plate assembly 100 requires no access from the nut side of nut plate assembly 100, which is advantageous for use with panels and other structure where access to both sides of nut plate assembly 100 is limited.

Figure 7:
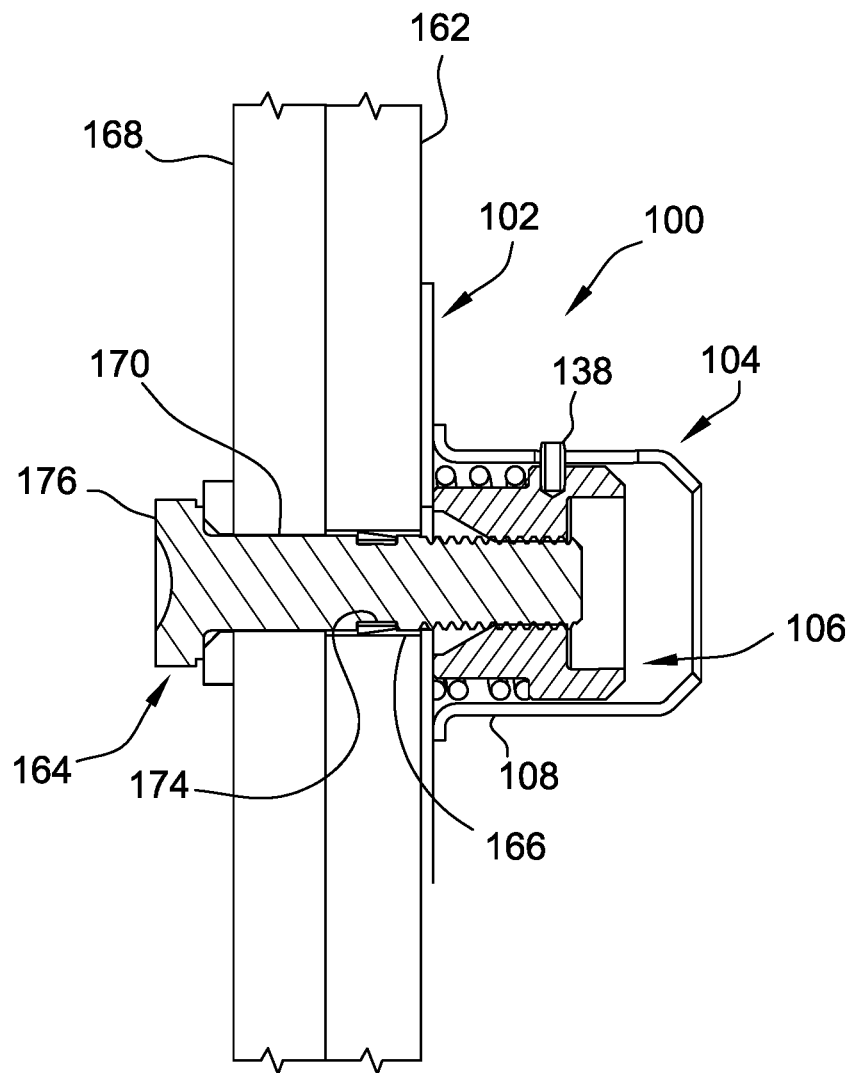
FIG. 7 is a cross-sectional view of the nut plate assembly shown in FIG. 1, coupled to a mounting structure and including a captive fastener.

FIG. 7 is a cross-sectional view of installed nut plate assembly 100 coupled to mounting structure 162, including a captive fastener 164. In the exemplary embodiment, nut plate assembly 100 is coupled to mounting structure 162 by, for example, and without limitation, adhesive bonding. Mounting structure 162 includes an aperture 166 defined therethrough and sized to receive at least a portion of fastener 164. Fastener 164 also extends through a panel 168 via aperture 170. In the exemplary embodiment, aperture 170 has a diameter smaller than the diameter of aperture 166. This facilitates capturing fastener 164 in panel 168 by a locking mechanism 172. In particular, fastener 164 includes locking mechanism 172. In the exemplary embodiment, locking mechanism 172 is a lock ring. In alternative embodiments, locking mechanism 172 includes, for example, and without limitation, a retaining ring, an E-clip, a spring plunger, and/or any mechanism configured to facilitate capturing fastener 164 in panel 168. In the exemplary embodiment, locking mechanism 172 is coupled to a groove 174 formed in fastener 164 a predetermined distance from a head 176 of fastener 164. For example, groove 174 may be formed at a distance that enables panel 168 to be positioned between head 176 and locking mechanism 172, thereby facilitating capturing fastener 164 in panel 168. As fastener 164 is inserted through aperture 170, locking mechanism 172 collapses into groove 174. After locking mechanism 172 passes through aperture 170, it expands radially to its original diameter to prevent fastener 164 from being pulled back through panel 168.

In the exemplary embodiment, fastener 164 is a panel bolt having a hexagonal head 176. Alternatively, fastener 164 is any type of fastener having head 176 taking any shape or form, including for example, and without limitation, a spline head, a flat head, a socket cap head, and a pan head. In some embodiments, fastener 164 is a locking fastener, including one or more components configured to lock fastener 164 against rotation relative to panel 168.

Panel 168, with fastener 164, is introduced to mounting structure 162 with nut plate assembly 100 for assembly. Fastener 164 is aligned with floating nut 106 and panel 168 is pushed toward mounting structure 162 until fastener 164 contacts female threaded portion 152 of floating nut 106. Fastener 164 is threadably engaged with floating nut 106. Floating nut 106 is drawn toward fastener 164 and compresses bias member 108. The spring rate of bias member 108 can be adjusted by increasing or decreasing the wire diameter and/or the length of bias member 108, as described herein. Further, in some embodiments, the force of bias member 108 against floating nut 106 may be adjusted by increasing or decreasing an amount of torque applied to fastener 164. For example, as the torque applied to fastener 164 is increased, bias member 108 is compressed and increases the force against floating nut 106 until floating nut 106 is seated against wall portion 110. In addition, as the torque applied to fastener 164 is decreased, bias member 108 is decompressed and decreases the force against floating nut 106 until floating nut 106 is biased against second end 130 of shell member 104.

Figure 8:
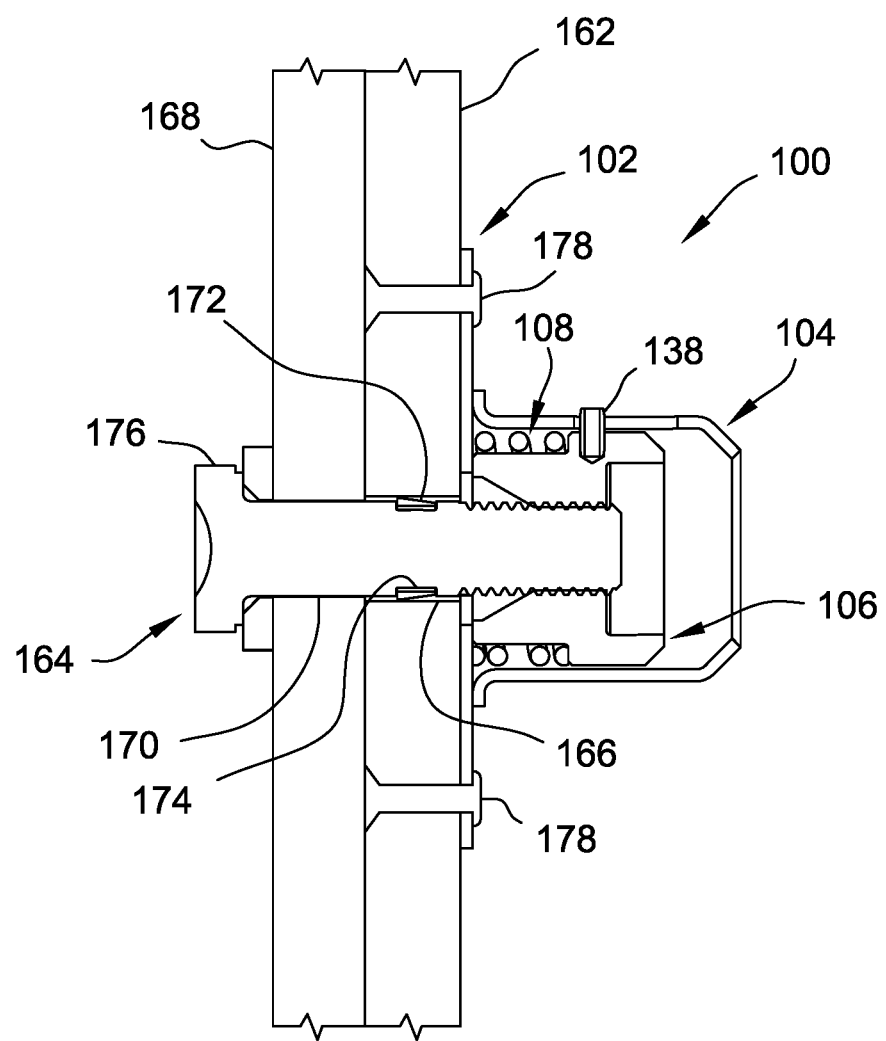
FIG. 8 is a cross-sectional view of another embodiment of the nut plate assembly shown in FIG. 1, coupled to the mounting structure and including the captive fastener assembly shown in FIG. 7.

FIG. 8 is a cross-sectional view of another embodiment of installed nut plate assembly 100 coupled to mounting structure 162, and including captive fastener 164. In the exemplary embodiment, nut plate assembly 100 is mechanically coupled to mounting structure 162 by fasteners 178. In the exemplary embodiment, fasteners 178 include, for example, and without limitation, nut and bolt combinations, sheet metal fasteners, rivets, and the like.

Figure 9:
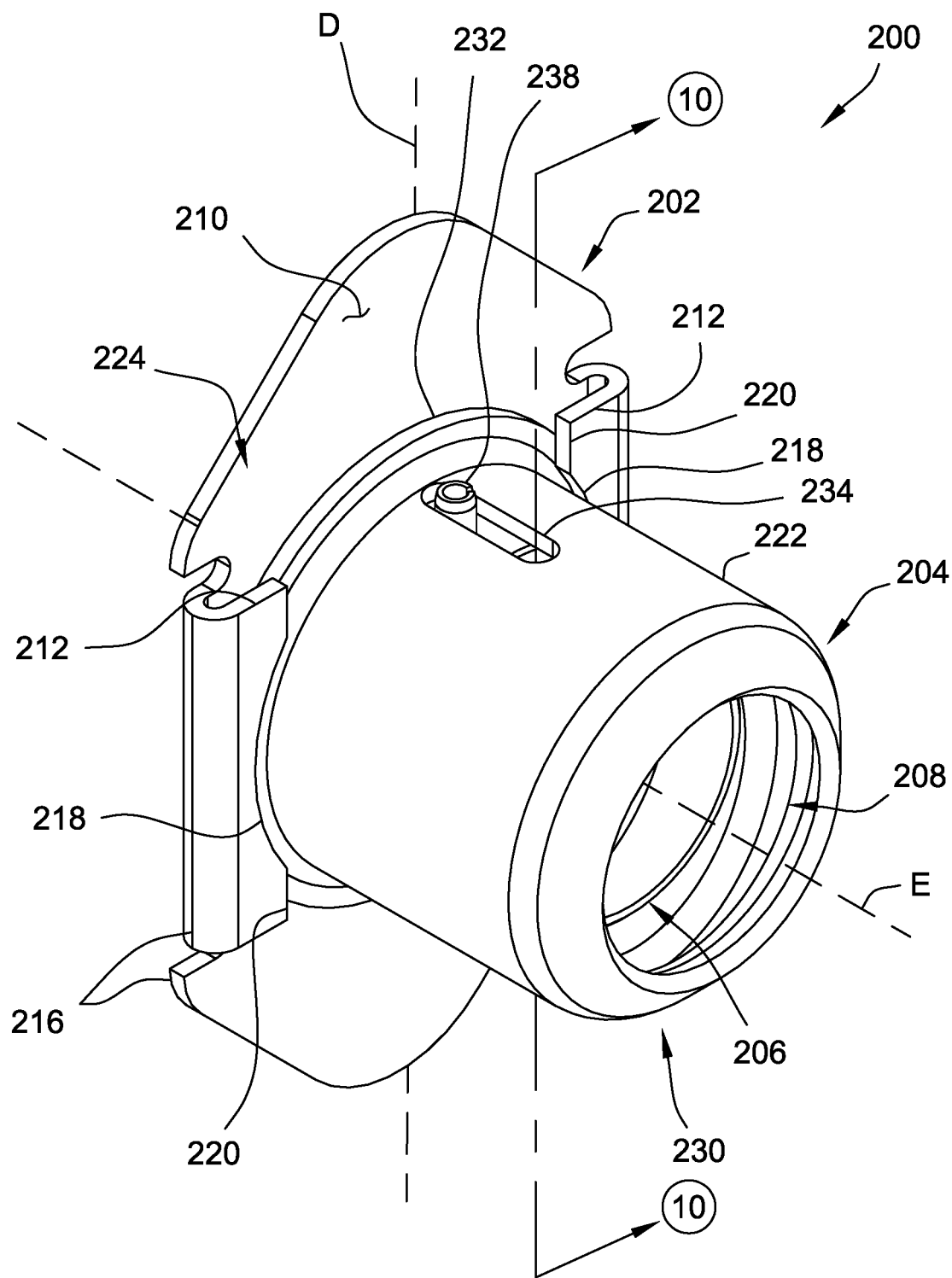
FIG. 9 is a perspective view of another spring-loaded nut plate assembly.
Figure 10:
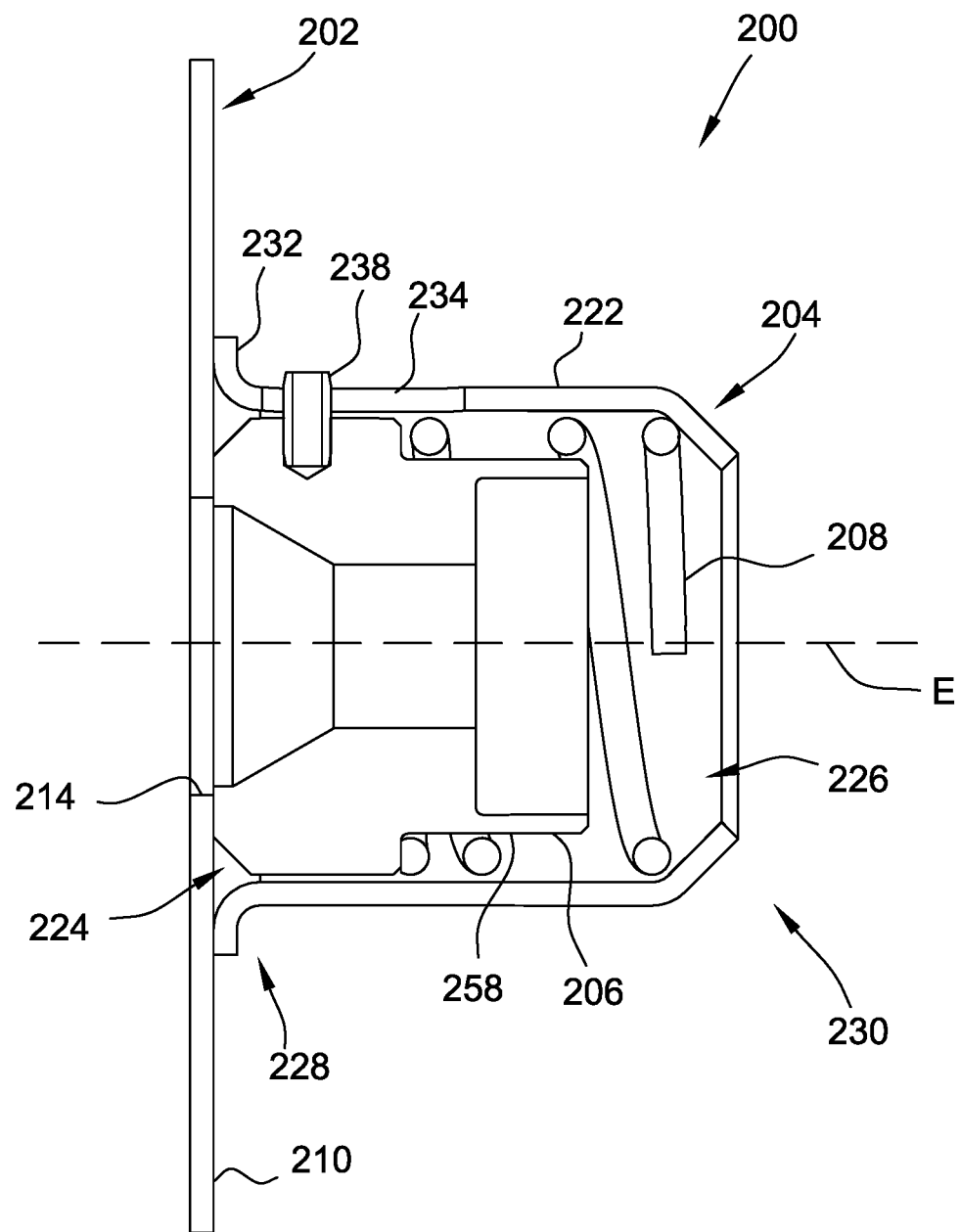
FIG. 10 is a cross-sectional view of the nut plate assembly shown in FIG. 9, taken about line 10-10 shown in FIG. 9.

FIG. 9 is a perspective view of a spring-loaded nut plate assembly 200. FIG. 10 is a cross-sectional view of nut plate assembly 200, taken about line 10-10 shown in FIG. 9. In the exemplary embodiment, nut plate assembly 200 is similar to nut plate assembly 100 (shown in FIG. 1) and includes a plate member 202, a shell member 204, a floating nut 206, and a bias member 208. Plate member 202 includes a wall portion 210 and a plurality of retention tabs 212 integrally formed with wall portion 210. Wall portion 210 includes an aperture 214 defined therethrough for receiving a fastener (not shown in FIGS. 9 and 10). Retention tabs 212, prior to coupling shell member 204 to plate member 202, lie in a plane of wall portion 210. In another embodiment, retention tabs 212 may be folded or bent perpendicular to wall portion 210. During assembly of nut plate assembly 200, retention tabs 212 are curled or bent along a respective edge 216 of plate member 202 to facilitate coupling shell member 204 to plate member 202. Each retention tab 212 has a semi-circular cutout 218 defined on an edge 220 of each retention tab 212.

In the exemplary embodiment, shell member 204 includes a substantially cylindrical wall 222 that defines a first opening 224 at a first end 228 and a second opening 226 at a second end 230 of shell member 204. First opening 224 and second opening 226 are generally concentric with each other. Shell member 204 includes a flange 232 formed at first end 228. At second end 230, cylindrical wall 222 tapers radially inward, e.g., by a swaging process, to facilitate retaining floating nut 206 within shell member 204 when shell member 204 is coupled to plate member 202.

Also, in the exemplary embodiment, floating nut 206 is disposed within shell member 204 and is moveable relative to cylindrical wall 222. For example, floating nut 206 is moveable along a central axis of shell member 204 between a first position and a second position. In the first position, floating nut 206 is proximate first end 228. In the second position, floating nut 206 is proximate second end 230. In alternative embodiments, floating nut 206 is moveable in any manner that enables nut plate assembly 200 to operate as described herein.

In the exemplary embodiment, shell member 204 includes a longitudinal slot 234 defined through cylindrical wall 222. Longitudinal slot 234 extends substantially axially along a centerline "E" of shell member 204 a predetermined length. Longitudinal slot 234 is sized and shaped to receive an anti-rotation pin 238 therethrough. In particular, anti-rotation pin 238 is coupled to floating nut 206 and extends through longitudinal slot 234 to facilitate preventing rotation of floating nut 206 while enabling axial movement during use of nut plate assembly 200. In the exemplary embodiment, anti-rotation pin 238 is a spring pin. Alternatively, anti-rotation pin 238 may be any type of anti-rotation mechanism that secures floating nut 206 as described herein, including for example, and without limitation, a dowel pin and/or a threaded fastener.

In the exemplary embodiment, bias member 208 is positioned within shell member 204 and between floating nut 206 and second end 230 of shell member 204. As such, bias member 208 facilitates biasing floating nut 206 axially toward plate member 202 and towards the first position. During use of nut plate assembly 200, bias member 208 facilitates pushing the attaching structure apart as a fastener (not shown in FIGS. 9 and 10) is coupled with floating nut 206. Bias member 208 may function as a damping element. In the exemplary embodiment, bias member 208 is a compression spring. Alternatively, bias member 208 may be any type of bias or force provider that enables nut plate assembly 200 to function as described herein. The force on floating nut 206 may be adjusted by varying the wire diameter and spring length of bias member 208. In the exemplary embodiment, the wire diameter and spring length of bias member 208 is selected to provide a desired bias force for operation of nut plate assembly 200, while maintaining bias member 208 in an axial resiliency range.

Figure 11:
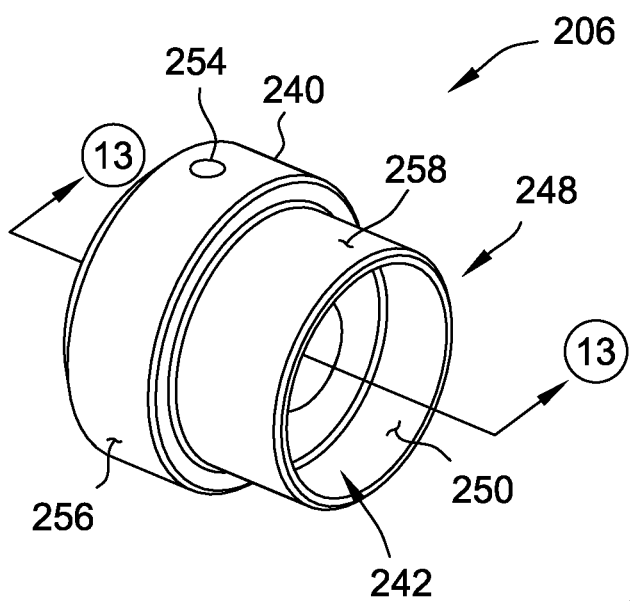
FIG. 11 is a perspective view of a floating nut for use with the nut plate assembly shown in FIG. 9.
Figure 12:
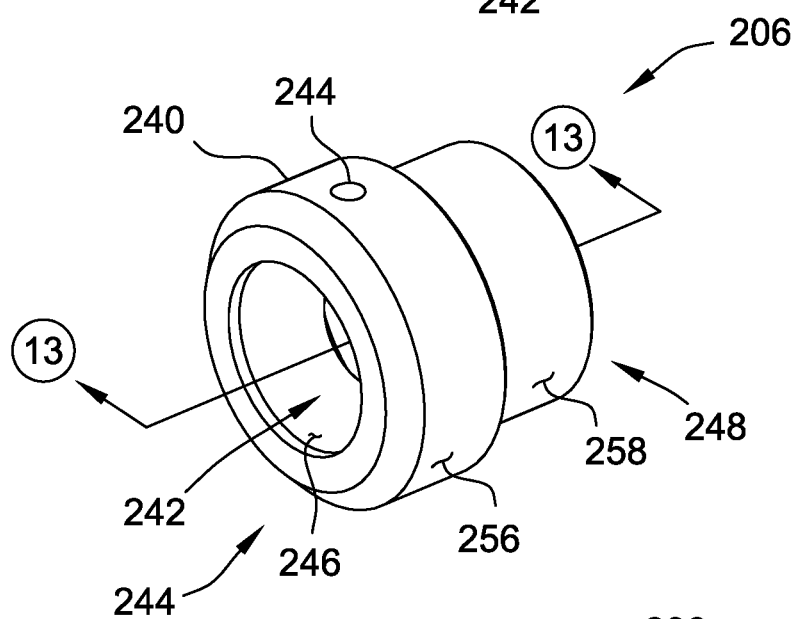
FIG. 12 is another perspective view of the floating nut shown in FIG. 11.
Figure 13:
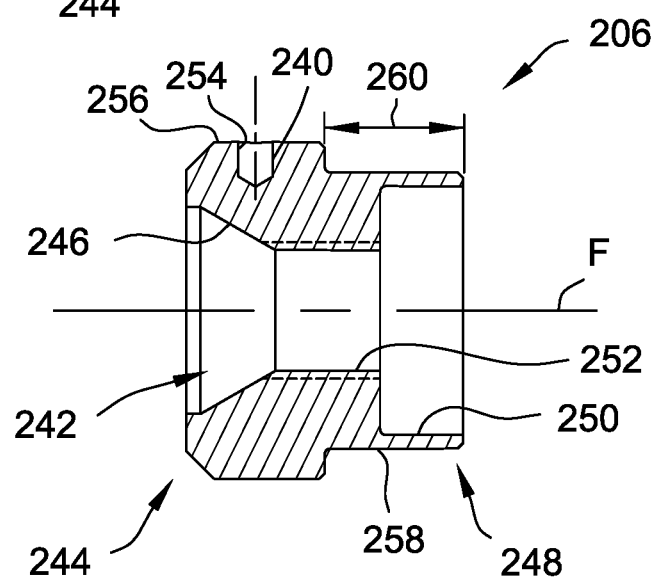
FIG. 13 is a cross-sectional view of the floating nut shown in FIG. 11, taken about line 13-13 shown in FIGS. 11 and 12.

FIG. 11 is a perspective view of floating nut 206 for use with nut plate assembly 200 (shown in FIG. 9). FIG. 12 is another perspective view of floating nut 206. FIG. 13 is a cross-sectional view of floating nut 206 taken about line 13-13 shown in FIGS. 11 and 12. In the exemplary embodiment, floating nut 206 has a substantially cylindrical body 240 that defines a bore 242 therethrough. At a first end 244 of cylindrical body 240, bore 242 includes a tapered portion 246 configured to facilitate aligning a fastener (not shown in FIGS. 11-13) with cylindrical body 240. At a second end 248 of cylindrical body 240, bore 242 includes a counter bored portion 250. Bore 242 includes a female threaded portion 252 extending between tapered portion 246 and counter bored portion 250 for threadably coupling to a fastener during use of nut plate assembly 200. In the exemplary embodiment, counter bored portion 250 functions as a way to control a length of female threaded portion 252 to facilitate maintaining a thread engagement length to about one times the thread diameter, while allowing the fastener to extend through female threaded portion 252. In addition, counter bored portion 250 facilitates fabricating cylindrical body 240 with a shoulder portion 258 having a length sufficient to prevent over-stressing and/or damaging bias member 208 while maintaining a thread engagement length to about one times the thread diameter, as described further herein.

Floating nut 206 includes a hole 254 defined in an outer surface 256 of cylindrical body 240. In particular, hole 254 is formed in outer surface 256 substantially perpendicular to centerline "F" of cylindrical body 240. In the exemplary embodiment, hole 254 extends a predetermined depth into cylindrical body 240, but does not extend through to bore 242. In alternative embodiments, hole 254 may extend any depth into cylindrical body 240, including, for example, entirely through cylindrical body 240. Hole 254 is sized and shaped to receive anti-rotation pin 238 therein. In particular, hole 254 is sized to form an interference fit with anti-rotation pin 238. As used herein, the phrase "interference fit" means a value of tightness between anti-rotation pin 238 and hole 254, i.e., an amount of radial clearance between the components, as described above. Alternatively, anti-rotation pin 238 may be coupled to cylindrical body 240 using any suitable fastening technique that enables nut plate assembly 200 to function as described herein. In the exemplary embodiment, an upper portion of anti-rotation pin 238 extends through longitudinal slot 234 to facilitate preventing rotation of floating nut 206 while enabling axial movement during use of nut plate assembly 200.

In the exemplary embodiment, floating nut 206 includes shoulder portion 258 extending from second end 248 axially along cylindrical body 240 a predetermined distance 260 that facilitates preventing over-stressing and/or damaging bias member 208 when bias member 208 is compressed, while enabling bias member 208 to urge cylindrical body 240 toward plate member 202 when extended. Shoulder portion 258 has a diameter than is smaller than the diameter of outer surface 256 of cylindrical body 240. In particular, shoulder portion 258 has a diameter configured to enable bias member 208 to slide onto shoulder portion 258, as shown in FIG. 10. Shoulder portion 258 enables bias member 208 to apply an axial force to cylindrical body 240 to urge cylindrical body 240 toward plate member 202, as described herein.

Nut plate assembly 200 is assembled substantially similar to nut plate assembly 100 described above. For example, to assemble nut plate assembly 200, bias member 208 is placed into shell member 204. Floating nut 206 is placed into shell member 204 such that bias member 208 seats about shoulder portion 258 of floating nut 206. Hole 254 of floating nut 206 is aligned with longitudinal slot 234. Anti-rotation pin 238 is press fit into hole 254 such that an end of anti-rotation pin 238 extends through longitudinal slot 234. First opening 224 of shell member 204 is substantially aligned with aperture 214 of plate member 202. Shell member 204 is pressed against plate member 202, thereby compressing bias member 208 within shell member 204. Retention tabs 212 are then curled or bent over flange 232 of shell member 204 to axially retain shell member 204 to plate member 202.

Figure 14:
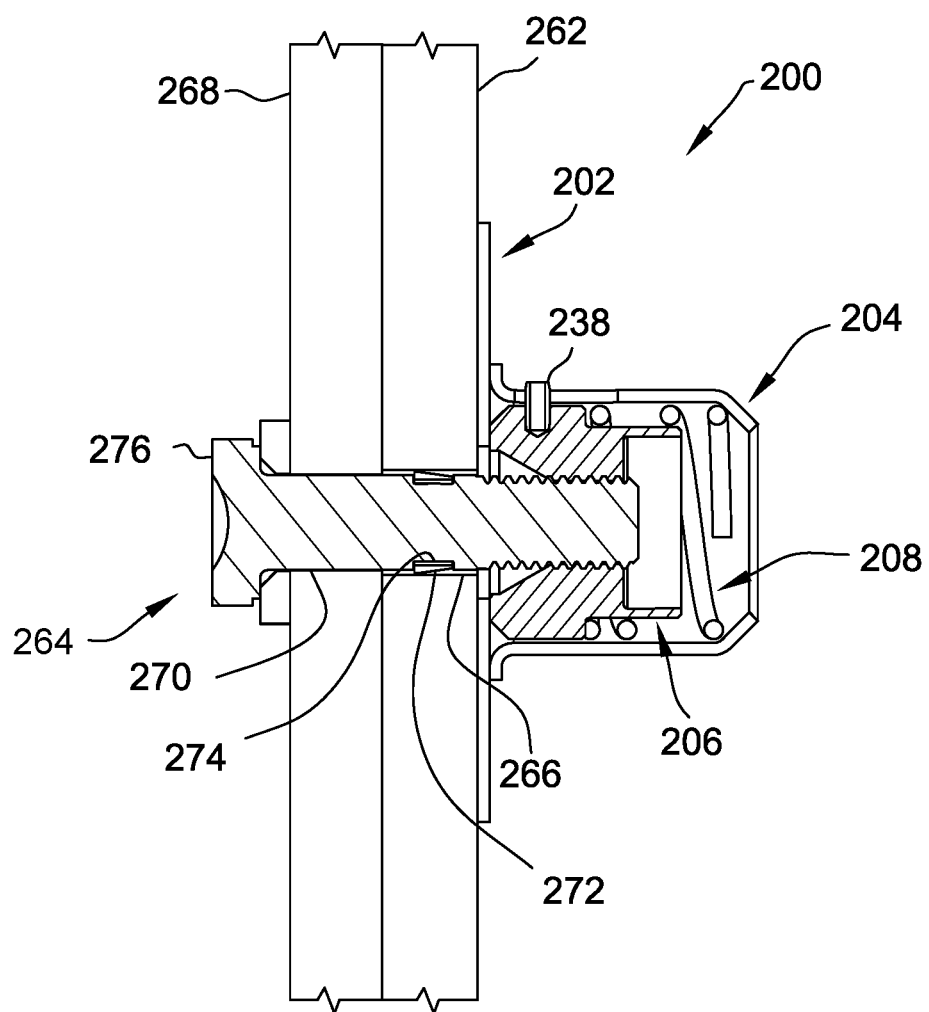
FIG. 14 is a cross-sectional view of the nut plate assembly shown in FIG. 9, coupled to a mounting structure and including a captive fastener.

FIG. 14 is a cross-sectional view of installed nut plate assembly 200 coupled to mounting structure 262, including a captive fastener 264. In the exemplary embodiment, nut plate assembly 200 is coupled to mounting structure 262 by, for example, and without limitation, adhesive bonding. Alternatively, nut plate assembly 200 is mechanically coupled to mounting structure 262, for example, and without limitation, by nut and bolt combinations, sheet metal fasteners, rivets, and the like. In the exemplary embodiment, mounting structure 262 includes an aperture 266 defined therethrough and sized to receive at least a portion of fastener 264. Fastener 264 extends through a panel 268 via aperture 270. In the exemplary embodiment, aperture 270 has a diameter smaller than the diameter of aperture 266. This facilitates capturing fastener 264 in panel 268 by locking mechanism 272. In particular, fastener 264 includes locking mechanism 272. In the exemplary embodiment, locking mechanism 272 is a lock ring. In alternative embodiments, locking mechanism 272 includes, for example, and without limitation, a retaining ring, an E-clip, a spring plunger, and/or any mechanism configured to facilitate capturing fastener 264 in panel 268. In the exemplary embodiment, locking mechanism 272 is coupled to a groove 274 formed in fastener 264 a predetermined distance from a head 276 of fastener 264. For example, groove 274 may be formed at a distance that enables panel 268 to be positioned between head 276 and locking mechanism 272, thereby facilitating capturing fastener 264 in panel 268. As fastener 264 is inserted through aperture 270, locking mechanism 272 collapses into groove 274. After locking mechanism 272 passes through aperture 270, it expands radially to its original diameter to prevent fastener 264 from being pulled back through panel 268. Panel 268, with fastener 264, is introduced to mounting structure 262 with nut plate assembly 200 for assembly. Fastener 264 is aligned with floating nut 206 and panel 268 is pushed toward mounting structure 262 until fastener 264 contacts female threaded portion 252 of floating nut 206. Fastener 264 is threadably engaged with floating nut 206 to secure panel 268 to mounting structure 262.

Figure 15:
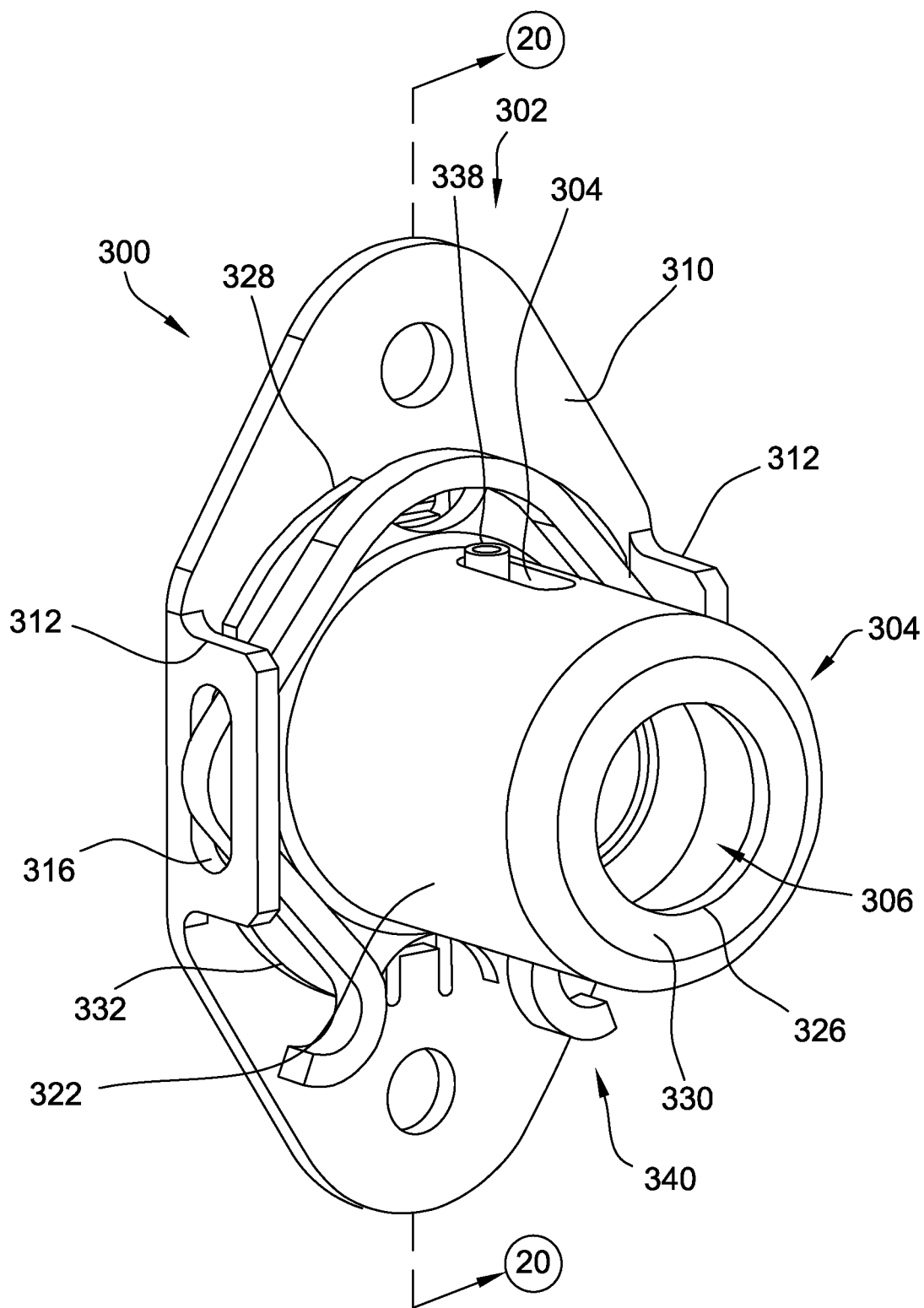
FIG. 15 is a perspective view of another spring-loaded nut plate assembly.
Figure 16:
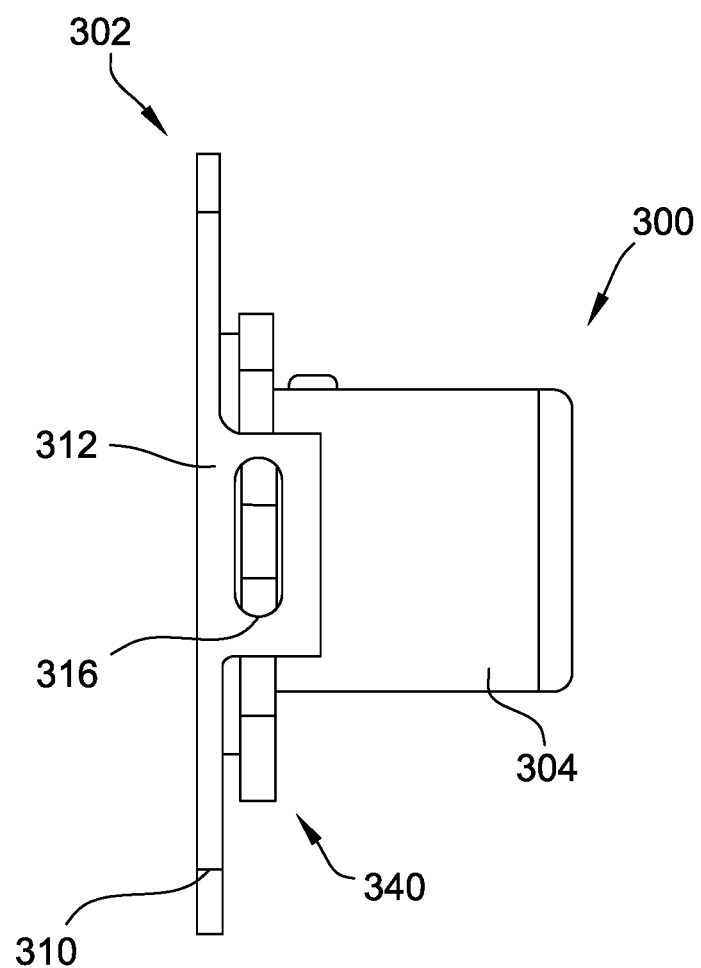
FIG. 16 is a side view of the nut plate assembly shown in FIG. 15.
Figure 17:
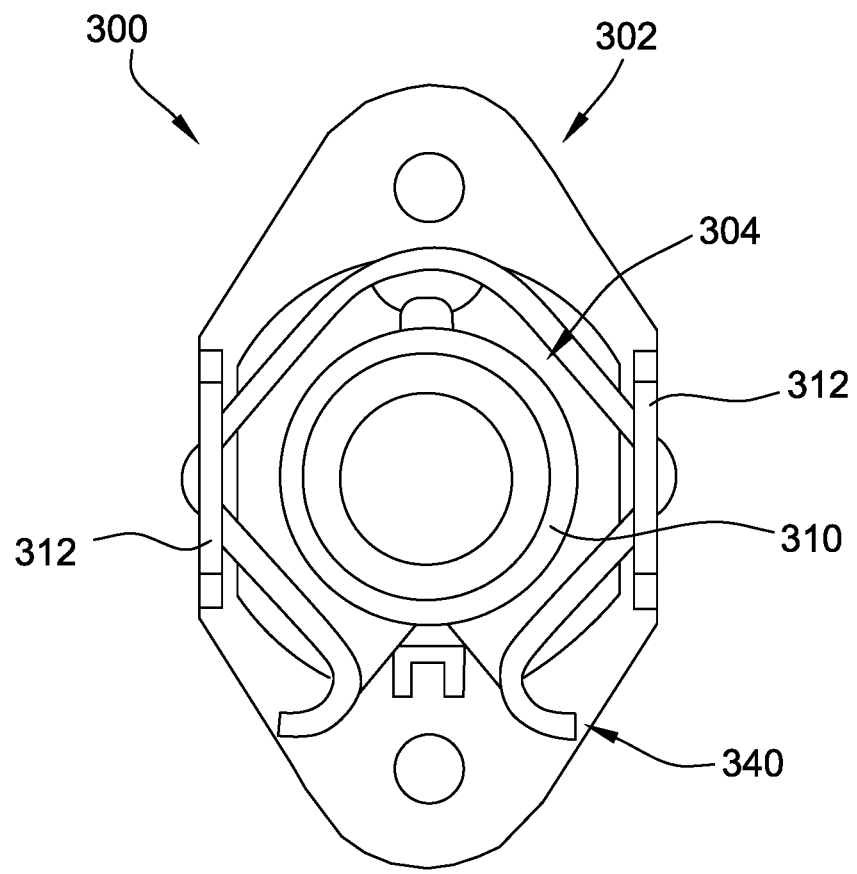
FIG. 17 is an end view of the nut plate assembly shown in FIG. 15.

FIG. 15 is a perspective view of a spring-loaded nut plate assembly 300. FIG. 16 is a side view of nut plate assembly 300. FIG. 17 is an end view of nut plate assembly 300. In the exemplary embodiment, nut plate assembly 300 is similar to nut plate assembly 100 (shown in FIG. 1) and nut plate assembly 200 (shown in FIG. 10) and includes a plate member 302, a shell member 304, a floating nut 306, and a bias member 308 (shown in FIG. 20). Plate member 302 includes a wall portion 310 and a plurality of retention tabs 312 integrally formed with wall portion 310. Wall portion 310 includes an aperture 314 defined therethrough for receiving a fastener (not shown in FIGS. 15-17). Retention tabs 312 extend from wall portion 310 and define openings 316. In alternative embodiments, nut plate assembly 300 includes any plate member 302 that enables nut plate assembly 300 to function as described herein.

In the exemplary embodiment, shell member 304 includes a substantially cylindrical wall 322 that defines a first opening 324 (shown in FIG. 20) at a first end 328 of shell member 304 and a second opening 326 at a second end 330 of shell member 304. Shell member 304 includes a flange 332 formed at first end 328. At second end 330, cylindrical wall 322 tapers radially inward, e.g., by a swaging process, to facilitate retaining floating nut 306 within shell member 304 when shell member 304 is coupled to plate member 302.

Also, in the exemplary embodiment, floating nut 306 is disposed within shell member 304 and is moveable relative to cylindrical wall 322. For example, floating nut 306 is moveable along a central axis of shell member 304 between a first position and a second position. In the first position, floating nut 306 is proximate first end 328. In the second position, floating nut 306 is proximate second end 330. In alternative embodiments, floating nut 306 is moveable in any manner that enables nut plate assembly 300 to operate as described herein.

Also, in the exemplary embodiment, shell member 304 includes a longitudinal slot 334 defined through cylindrical wall 322. Longitudinal slot 334 is sized and shaped to receive an anti-rotation pin 338 therethrough. In particular, anti-rotation pin 338 is coupled to floating nut 306 and extends through longitudinal slot 334 to prevent rotation of floating nut 306 while enabling axial movement during use of nut plate assembly 300. In the exemplary embodiment, anti-rotation pin 338 is a spring pin. Alternatively, anti-rotation pin 338 may be any type of anti-rotation mechanism that secures floating nut 306 as described herein, including for example, and without limitation, a dowel pin and/or a threaded fastener.

In addition, in the exemplary embodiment, nut plate assembly 300 includes a retention member 340 coupled to plate member 302 and shell member 304. In particular, in the exemplary embodiment, retention member 340 includes a clip 342 configured to extend at least partially around shell member 304 and extend over flange 332. Clip 342 is configured to engage retention tabs 312 when clip 342 is positioned around shell member 304. Accordingly, retention member 340 and retention tabs 312 couple shell member 304 to plate member 302 and axially retain shell member 304 with respect to plate member 302. First end 328 of shell member 304 contacts plate member 302 and flange 332 is positioned between clip 342 and wall portion 310 when retention member 340 is coupled to plate member 302 and shell member 304.

Figure 18:
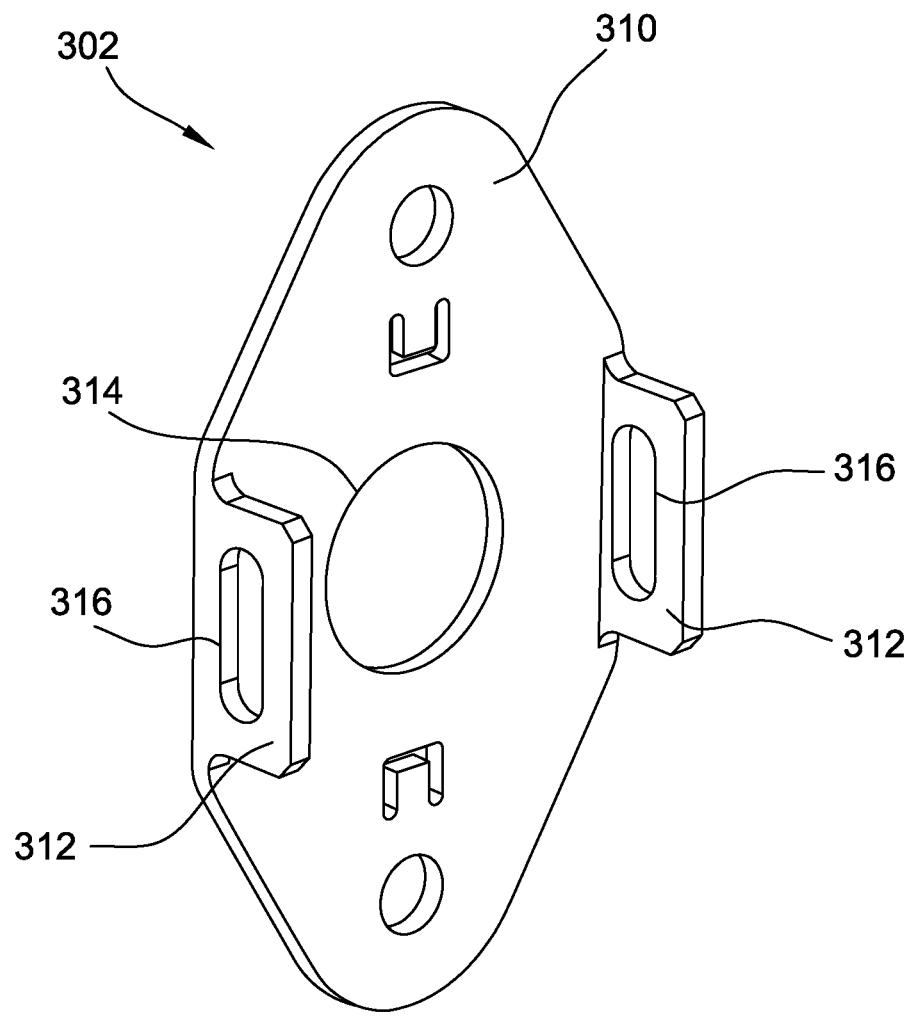
FIG. 18 is a perspective view of a plate member of the nut plate assembly shown in FIGS. 15-17.
Figure 19:
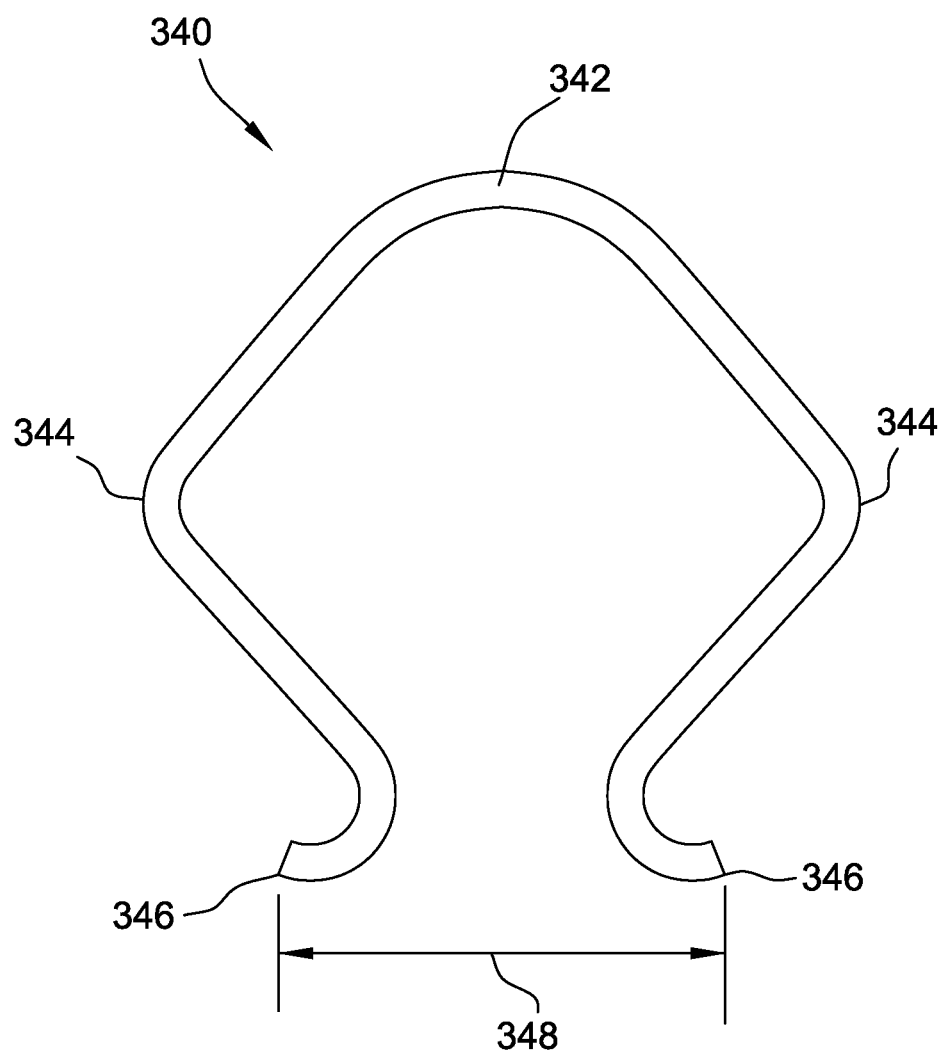
FIG. 19 is a top view of a retention member of the nut plate assembly shown in FIGS. 15-17.

FIG. 18 is a perspective view of plate member 302 of nut plate assembly 300 (shown in FIG. 15). FIG. 19 is a top view of retention member 340 of nut plate assembly 300 (shown in FIG. 15). Clip 342 of retention member 340 has a curved shape and is configured to extend around shell member 304 (shown in FIG. 15). In particular, clip 342 forms a loop. Ends 346 of clip 342 are adjacent each other and define a gap 348 therebetween. In addition, clip 342 includes elbows 344 which are configured to extend into openings 316 on opposite sides of plate member 302. In the exemplary embodiments, openings 316 are elongated slots that are configured to receive elbows 344. In alternative embodiments, retention member 340 engages plate member 302 in any manner that enables nut plate assembly (shown in FIG. 15) to operate as described herein. For example, in some embodiments, retention tabs 312 are omitted and retention member 340 engages wall portion 310. In further embodiments, retention member 340 includes openings 316 that receive retention tabs 312.

In addition, in the exemplary embodiment, clip 342 is positionable between a first position and a second position. In the first position, elbows 344 are spaced apart a first distance and clip 342 is configured to engage retention tabs 312. In the second position, elbows 344 are spaced apart a second distance that is less than the first distance and clip 342 is not engaged with retention tabs 312. Accordingly, the first position and the second position enable retention member 340 to be removably coupled to plate member 302 and shell member 304 (shown in FIG. 15). Moreover, retention member 340 enables removal of shell member 304 (shown in FIG. 15) and floating nut 306 (shown in FIG. 15) from plate member 302. For example, clip 342 is moved between the first position and the second position by pressing on ends 346 of clip 342 to decrease the width of gap 348. In the second position, elbows 344 do not extend through openings 316 in retention tabs 312 and allow removal of retention member 340 from nut plate assembly 300 (shown in FIG. 15). After retention member 340 is removed, shell member 304 (shown in FIG. 15) is free from plate member 302. In alternative embodiments, shell member 304 is coupled to plate member 302 in any manner that enables floating nut plate assembly 300 (shown in FIG. 15) to operate as described herein. For example, in some embodiments, retention member 340 includes, without limitation, a spring, a hinge, a fastener, a clamp, and adhesive. In further embodiments, retaining clips 342 are flexible and are configured to move between a first position and a second position.

Figure 20:
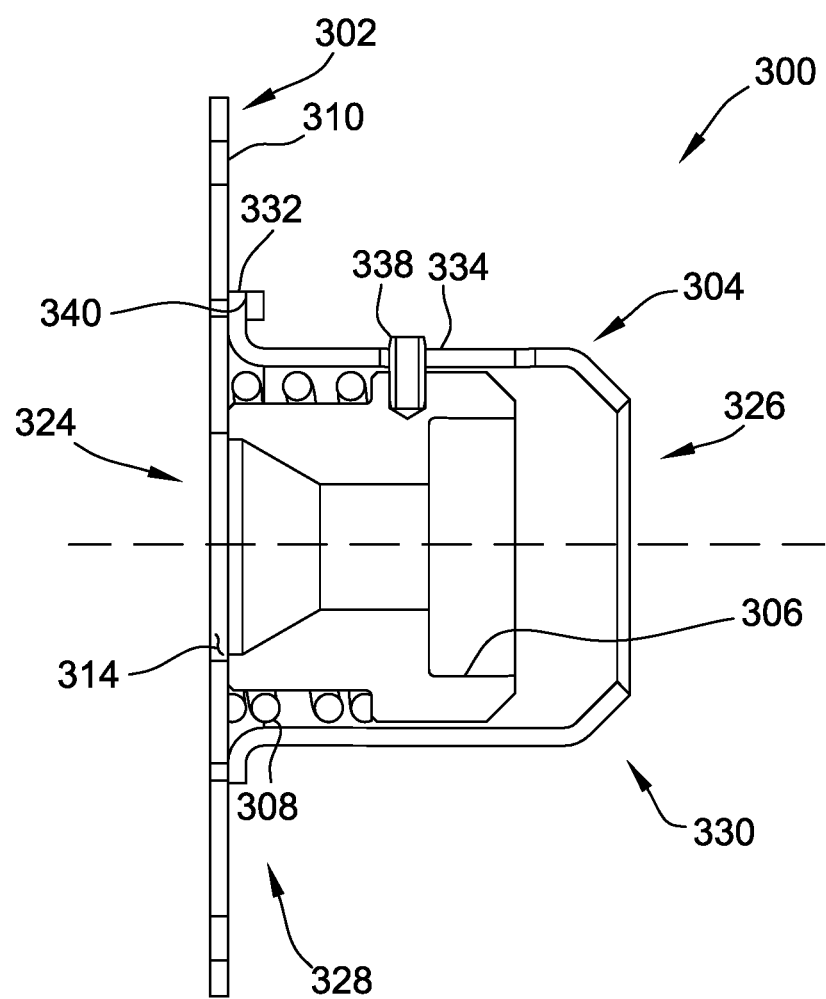
FIG. 20 is a cross-sectional view of the nut plate assembly shown in FIGS. 15-17, taken about line 20-20 shown in FIG. 15.

FIG. 20 is a cross-sectional view of the nut plate assembly 300, taken about line 20-20 (shown in FIG. 15). In the exemplary embodiment, bias member 308 is positioned within shell member 304 and between plate member 302 and floating nut 306. As such, bias member 308 facilitates biasing floating nut 306 axially away from plate member 302 and towards the second position. During use of nut plate assembly 300, bias member 308 facilitates pulling the attaching structure together as a fastener (not shown in FIGS. 15-20) is coupled with floating nut 306. Bias member 308 may function as a damping element and facilitates providing a pre-load force to a fastened joint. In the exemplary embodiment, bias member 308 is a compression spring. Alternatively, bias member 308 may be any type of bias or force provider that enables nut plate assembly 300 to function as described herein. The pre-load force on floating nut 306 may be adjusted by varying the wire diameter and spring length of bias member 308. In the exemplary embodiment, the wire diameter and spring length of bias member 308 is selected to provide the necessary pre-load required for operation of nut plate assembly 300, while maintaining bias member 308 in an axial resiliency range. In alternative embodiments, nut plate assembly 300 includes any bias member 308 that enables nut plate assembly 300 to function as described herein. For example, in some embodiments, bias member 308 is positioned within shell member 304 and between floating nut 306 and second end 330.

Figure 21:
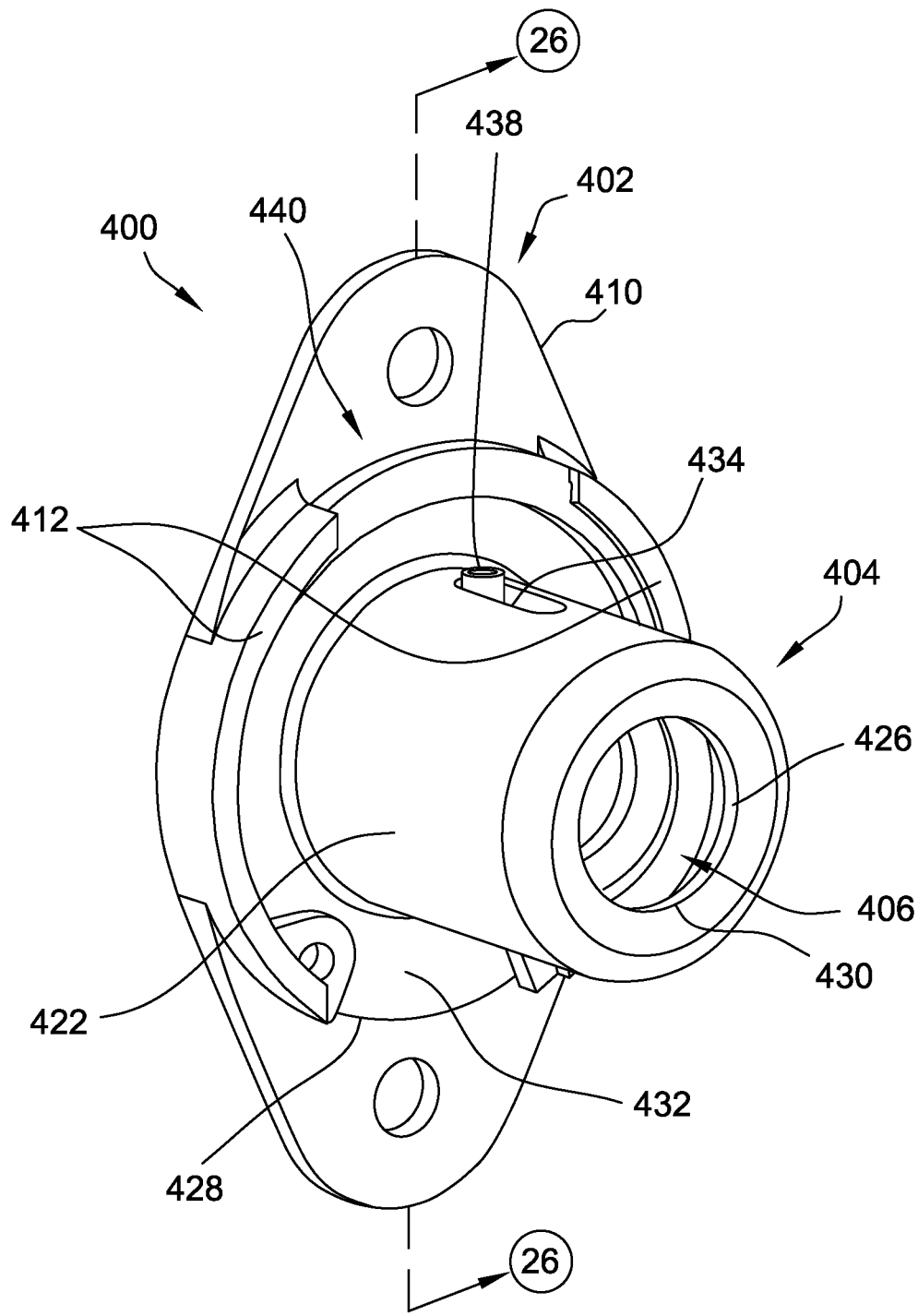
FIG. 21 is a perspective view of another spring-loaded nut plate assembly.
Figure 22:
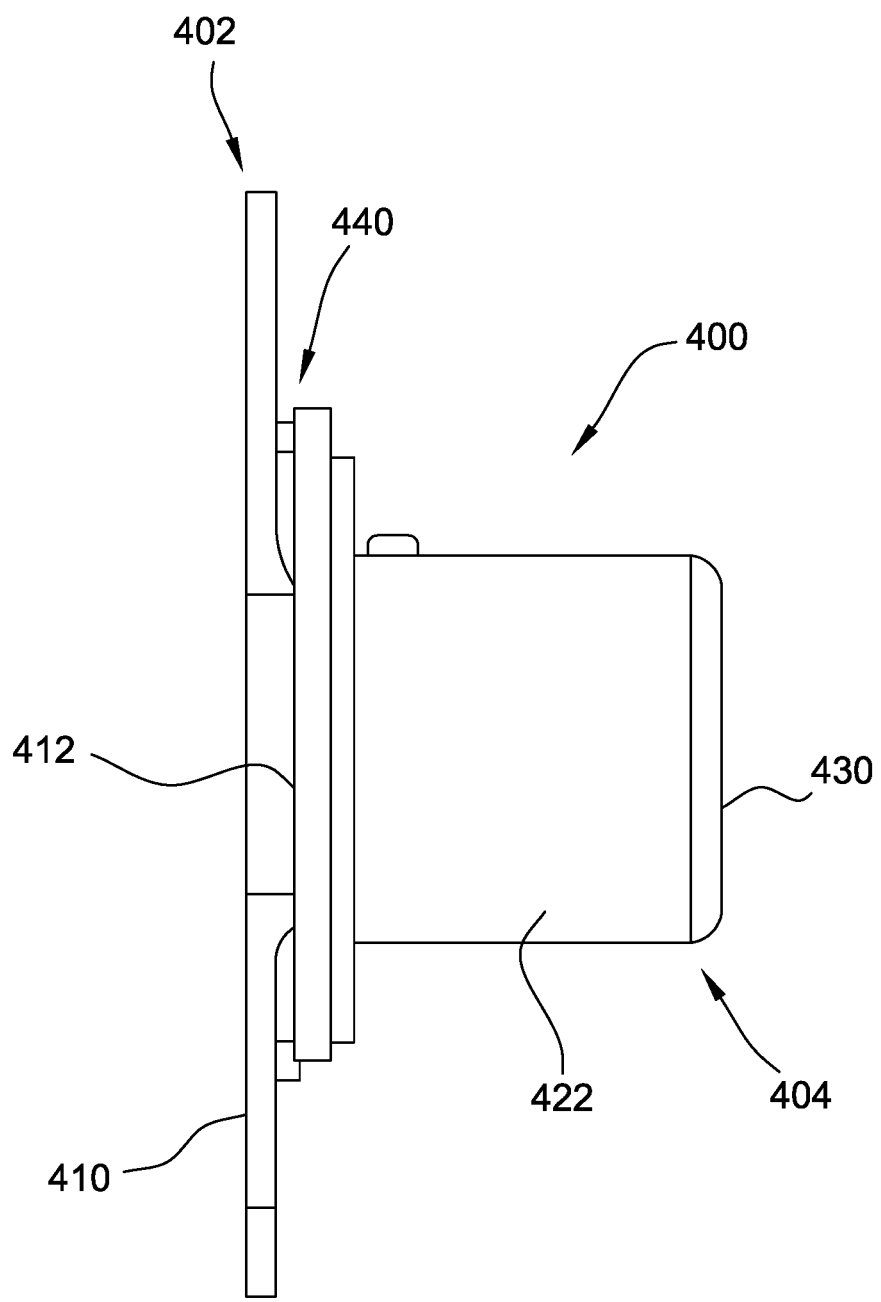
FIG. 22 is a side view of the nut plate assembly shown in FIG. 21.
Figure 23:
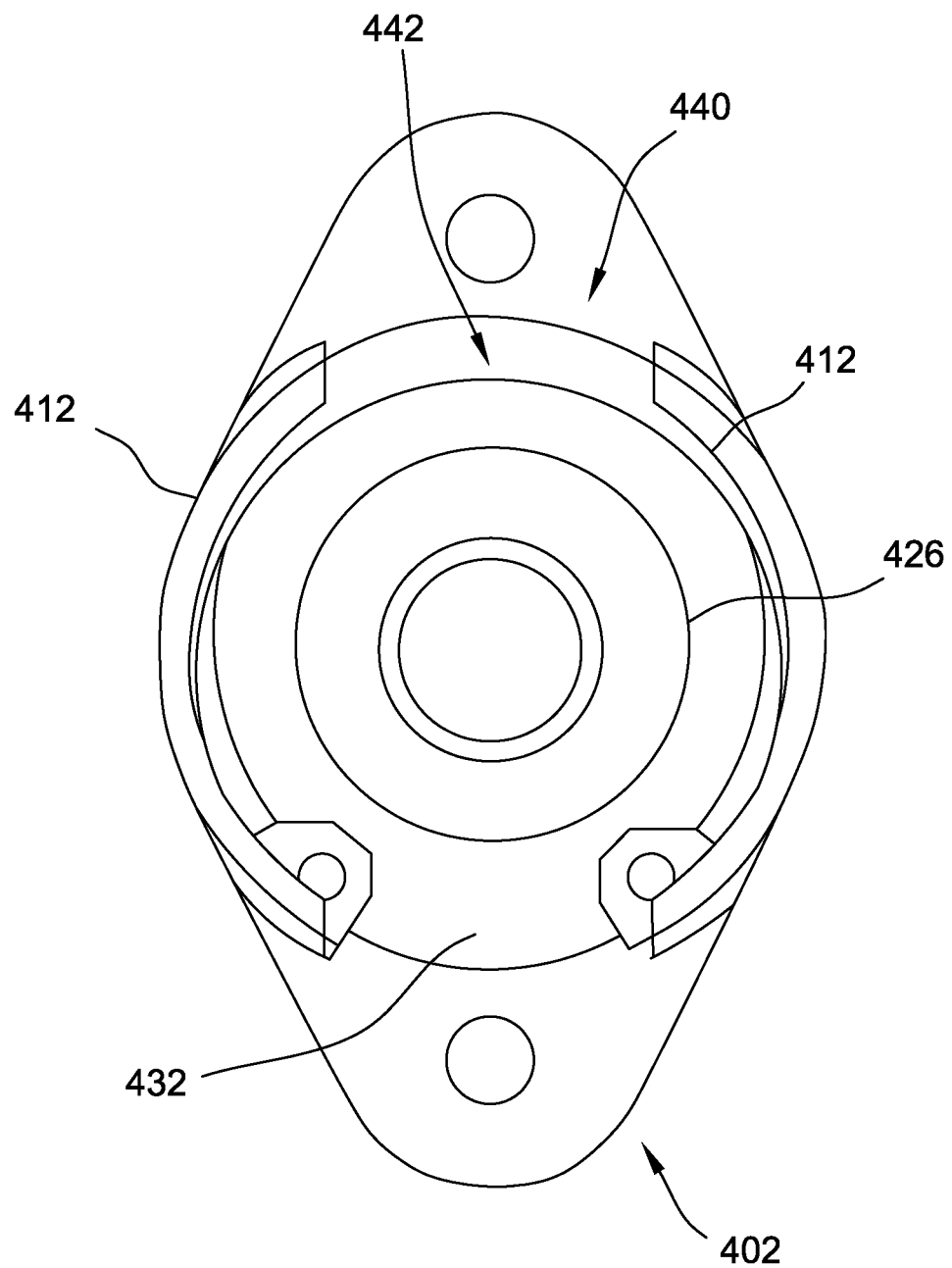
FIG. 23 is an end view of the nut plate assembly shown in FIG. 21.

FIG. 21 is a perspective view of a spring-loaded nut plate assembly 400. FIG. 22 is a side view of nut plate assembly 400. FIG. 23 is an end view of nut plate assembly 400. In the exemplary embodiment, nut plate assembly 400 is similar to nut plate assembly 300 (shown in FIG. 15) and includes a plate member 402, a shell member 404, a floating nut 406, and a bias member 408 (shown in FIG. 26). Plate member 402 includes a wall portion 410 and a plurality of retention tabs 412 integrally formed with wall portion 410. Wall portion 410 includes an aperture 414 defined therethrough for receiving a fastener (not shown in FIGS. 21-23). Retention tabs 412 extend from wall portion 410 and define channels 416. In alternative embodiments, nut plate assembly 400 includes any plate member 402 that enables nut plate assembly 400 to function as described herein.

In the exemplary embodiment, shell member 404 includes a substantially cylindrical wall 422 that defines a first opening 424 (shown in FIG. 26) at a first end 428 of shell member 404 and a second opening 426 at a second end 430 of shell member 404. Shell member 404 includes a flange 432 formed at first end 428. At second end 430, cylindrical wall 422 tapers radially inward, e.g., by a swaging process, to facilitate retaining floating nut 406 within shell member 404 when shell member 404 is coupled to plate member 402.

Also, in the exemplary embodiment, floating nut 406 is disposed within shell member 404 and is moveable relative to cylindrical wall 422. For example, floating nut 406 is moveable along a central axis of shell member 404 between a first position and a second position. In the first position, floating nut 406 is proximate first end 428. In the second position, floating nut 406 is proximate second end 430. In alternative embodiments, floating nut 406 is moveable in any manner that enables nut plate assembly 400 to operate as described herein.

Also, in the exemplary embodiment, shell member 404 includes a longitudinal slot 434 defined through cylindrical wall 422. Longitudinal slot 434 is sized and shaped to receive an anti-rotation pin 438 therethrough. In particular, anti-rotation pin 438 is coupled to floating nut 406 and extends through longitudinal slot 434 to prevent rotation of floating nut 406 while enabling axial movement during use of nut plate assembly 400. In the exemplary embodiment, anti-rotation pin 438 is a spring pin. Alternatively, anti-rotation pin 438 may be any type of anti-rotation mechanism that secures floating nut 406 as described herein, including for example, and without limitation, a dowel pin and/or a threaded fastener.

In addition, in the exemplary embodiment, nut plate assembly 400 includes a retention member 440 coupled to plate member 402 and shell member 404. In particular, in the exemplary embodiment, retention member 440 includes a clip 442 configured to extend at least partially around shell member 404 and extend over flange 432. Clip 442 is configured to engage retention tabs 412 when clip 442 is positioned around shell member 404. Accordingly, retention member 440 and retention tabs 412 couple shell member 404 to plate member 402 and axially retain shell member 404 with respect to plate member 402. First end 428 of shell member 404 contacts plate member 402 and flange 432 is positioned between clip 442 and wall portion 410 when retention member 440 is coupled to plate member 402 and shell member 404.

Figure 24:
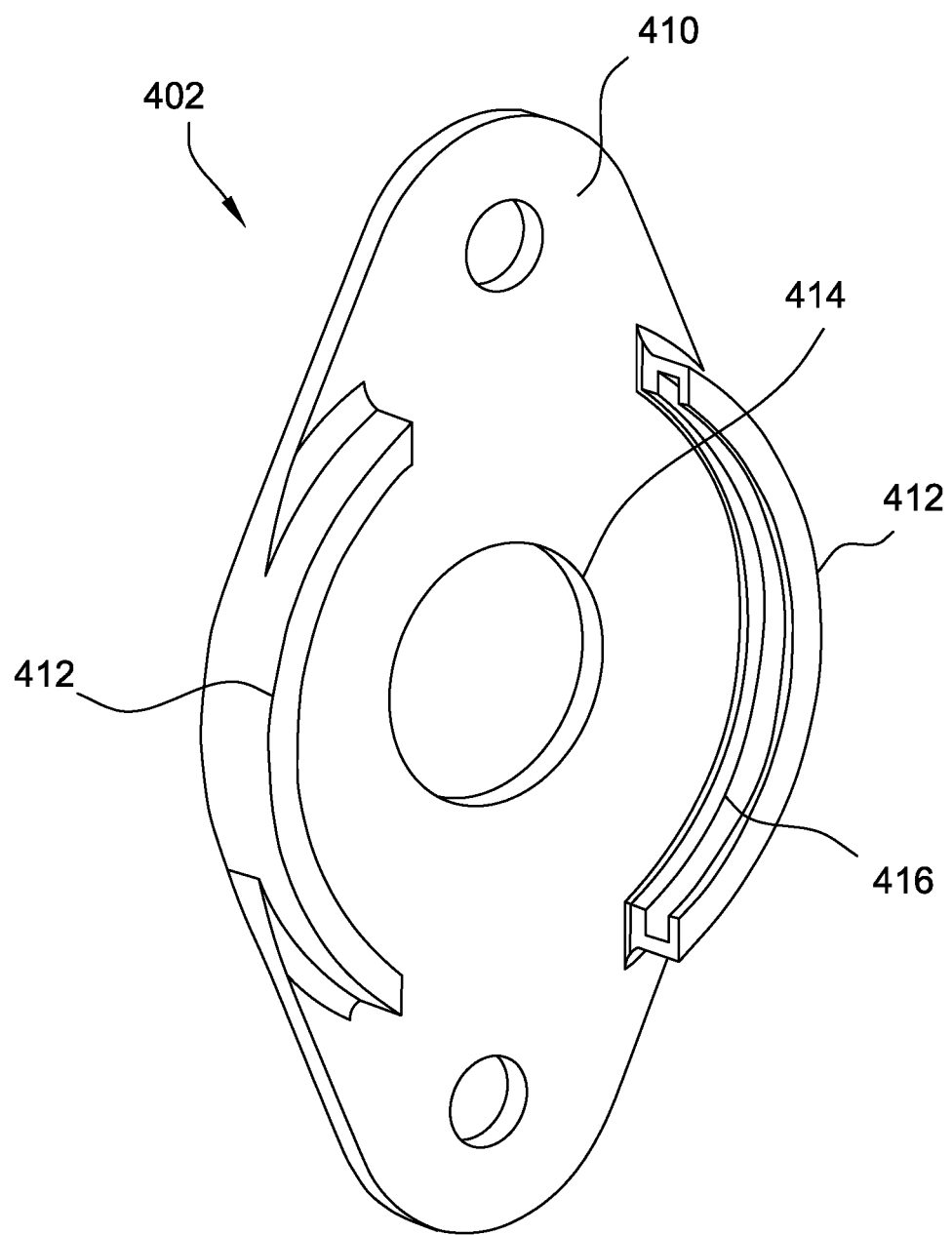
FIG. 24 is a perspective view of a plate member of the nut plate assembly shown in FIGS. 21-23.
Figure 25:
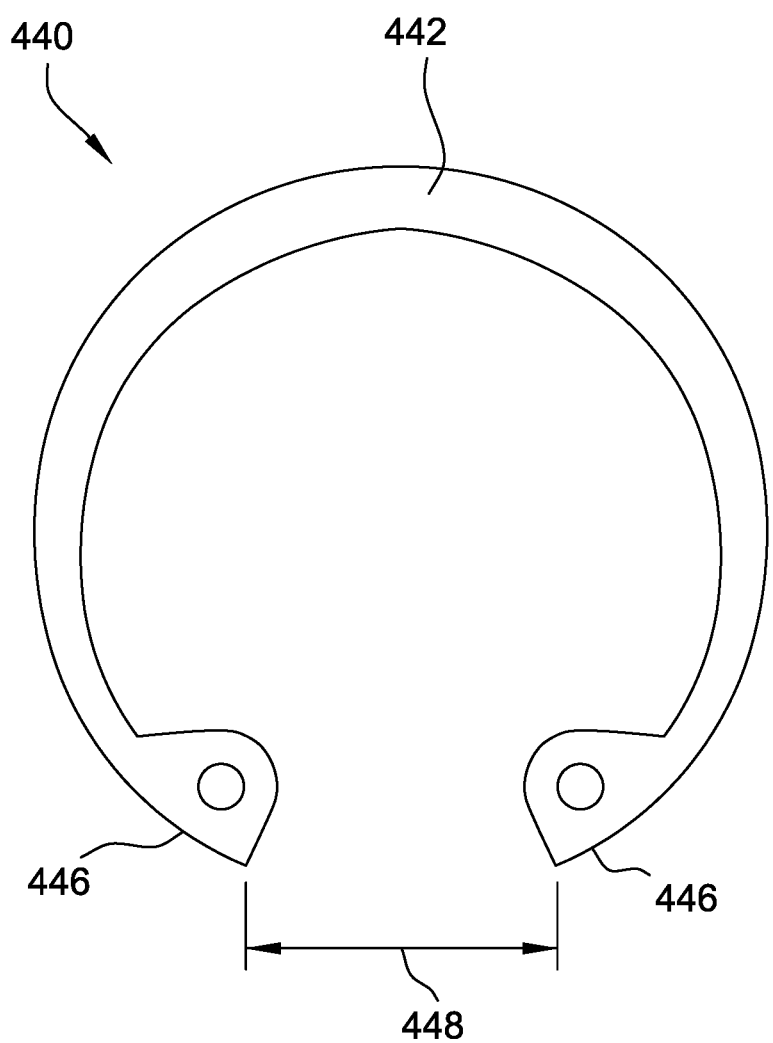
FIG. 25 is a top view of a retention member of the nut plate assembly shown in FIGS. 21-23.

FIG. 24 is a perspective view of plate member 402 of nut plate assembly 400 (shown in FIG. 21). FIG. 25 is a top view of retention member 440 of nut plate assembly 400 (shown in FIG. 21). Clip 442 of retention member 440 has a curved shape and is configured to extend around shell member 404 (shown in FIG. 21). In particular, clip 442 is a semicircle and includes ends 446 spaced circumferentially apart to define a gap 448 therebetween. In addition, clip 442 is sized and shaped to extend through channels 416 defined by retention tabs 412. In the exemplary embodiments, retention tabs 412 extend along at least a portion of the edge of wall portion 410 and are configured to extend over clip 442 when clip 442 extends through channels 416. In alternative embodiments, retention member 440 engages plate member 402 in any manner that enables nut plate assembly (shown in FIG. 21) to operate as described herein. For example, in some embodiments, retention member 440 includes a channel 416 that receives plate member 402.

In addition, in the exemplary embodiment, clip 442 is positionable between a first position and a second position. In the first position, clip 442 has a first diameter and is configured to engage retention tabs 412. In the second position, clip 442 has a second diameter that is less than the first diameter and clip 442 is not engaged with retention tabs 412. Accordingly, the first position and the second position enable retention member 440 to be removably coupled to plate member 402 and shell member 404 (shown in FIG. 21). Moreover, retention member 440 enables removal of shell member 404 (shown in FIG. 21) and floating nut 406 (shown in FIG. 21) from plate member 402. For example, clip 442 is moved between the first position and the second position by pressing on ends 446 of clip 442 to decrease the width of gap 448 and the diameter of clip 442. In the second position, clip 442 does not extend through channels 416 in retention tabs 412 and allows removal of retention member 440 from nut plate assembly 400 (shown in FIG. 21). After retention member 440 is removed, shell member 404 (shown in FIG. 21) is free from plate member 402.

Figure 26:
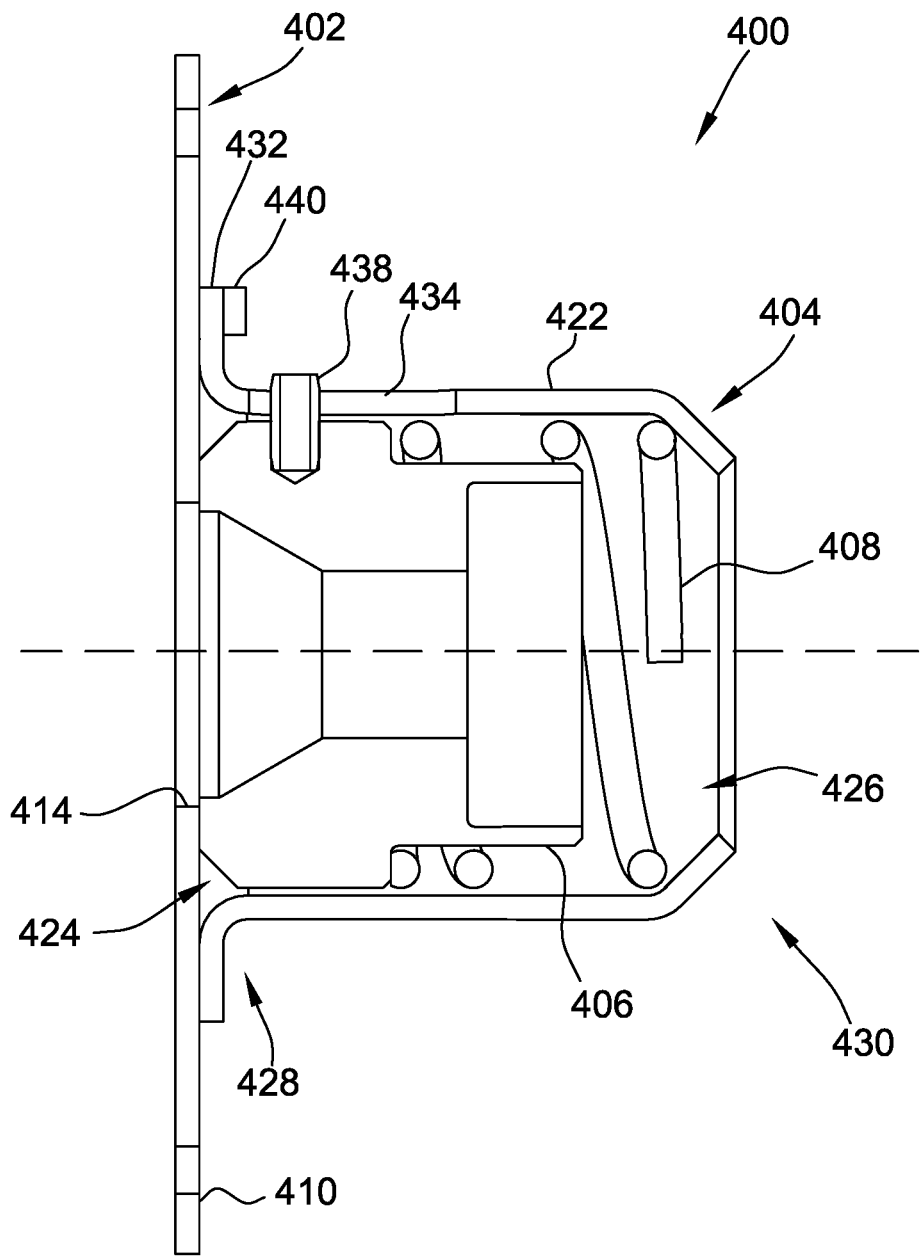
FIG. 26 is a cross-sectional view of the nut plate assembly shown in FIGS. 21-23, taken about line 26-26 shown in FIG. 21.

FIG. 26 is a cross-sectional view of nut plate assembly 400, taken about line 26-26 (shown in FIG. 21). In the exemplary embodiment, bias member 408 is positioned within shell member 404 and between floating nut 406 and second end 430 of shell member 404. As such, bias member 408 facilitates biasing floating nut 406 axially toward plate member 402 and towards the first position. During use of nut plate assembly 400, bias member 408 facilitates pushing the attaching structure apart as a fastener (not shown in FIGS. 21-26) is coupled with floating nut 406. Bias member 408 may function as a damping element. In the exemplary embodiment, bias member 408 is a compression spring. Alternatively, bias member 408 may be any type of bias or force provider that enables nut plate assembly 400 to function as described herein. The force on floating nut 406 may be adjusted by varying the wire diameter and spring length of bias member 408. In the exemplary embodiment, the wire diameter and spring length of bias member 408 is selected to provide a desired bias force for operation of nut plate assembly 400, while maintaining bias member 408 in an axial resiliency range. In alternative embodiments, nut plate assembly 400 includes any bias member 408 that enables nut plate assembly 400 to function as described herein. For example, in some embodiments, bias member 408 is positioned within shell member 404 and between plate member 402 and floating nut 406.

The components as described herein provide spring-loaded nut plate assemblies. For example, as described in the embodiments herein, a floating nut of the nut plate assemblies is biased by a bias member, which enables the use of captive panel screws. This facilitates ease of assembly and disassembly of a panel to an underlying structure. In addition, the spring-loaded nut plate assemblies facilitate varying length captive panel fasteners. The bias member facilitates one of pulling the structure components together or pushing them apart during assembly or removal of the panel structure. In addition, the bias member facilitates preventing damage to the internal threads of the floating nut during installation of the fastener.

Exemplary embodiments of spring-loaded nut plate assemblies are described above. The systems and methods are not limited to the specific embodiments described herein, but rather, components of the systems and/or operations of the methods may be utilized independently and separately from other components and/or operations described herein. Further, the described components and/or operations may also be defined in, or used in combination with, other systems, methods, and/or devices, and are not limited to practice with only the systems described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A nut plate assembly comprising:
   a plate member comprising a retention tab;
   a shell member comprising a first end coupled to said plate member by said retention tab and a second end opposite said first end, wherein said shell member is substantially cylindrical;
   a nut disposed within said shell member, said nut is configured to move axially relative to said shell member between a first position proximate said shell member first end and a second position proximate said shell member second end, said nut comprising a body including an outer surface defining a first diameter and a shoulder portion defining a second diameter, said body defining a bore having a threaded portion; and
   a bias member disposed within said shell member, said bias member configured to bias said nut toward one of said first position and said second position, wherein said shoulder portion is configured to receive a portion of said bias member, and wherein the second diameter defined by said shoulder portion is smaller than the first diameter defined by said outer surface to allow said bias member to extend along said shoulder portion and provide an axial force to said body.

2. A nut plate assembly in accordance with claim 1, wherein said retention tab comprises a semi-circular cutout defined at an edge of said retention tab.

3. A nut plate assembly in accordance with claim 1, wherein said shell member first end comprises a flange.

4. A nut plate assembly in accordance with claim 3, wherein said retention tab is bent over said flange to axially retain said shell member with respect to said plate member.

5. A nut plate assembly in accordance with claim 1, wherein said shell member second end comprises a taper that extends radially inward.

6. A nut plate assembly in accordance with claim 5, wherein said taper is formed by a swaging process.

7. A nut plate assembly in accordance with claim 1, wherein said shell member comprises a slot extending axially between said first and second ends.

8. A nut plate assembly in accordance with claim 7 further comprising an anti-rotation pin coupled to said nut, said anti-rotation pin extending through said slot.

9. A nut plate assembly in accordance with claim 1 further comprising a retention member configured to couple said shell member to said plate member, wherein said retention member is positionable between a first position and a second position, said retention member configured to engage said plate member when said retention member is in said first position.

10. A nut plate assembly in accordance with claim 9, wherein said retention tab is configured to engage said retention member when said retention member is in said first position.

11. A nut plate assembly in accordance with claim 9, wherein said retention member comprises a clip configured to extend at least partially around said shell member.

12. A nut plate assembly in accordance with claim 11, wherein said clip is removably coupled to said shell member and said plate member.

13. A nut plate assembly in accordance with claim 9, wherein said shell member first end comprises a flange configured to extend between said retention member and said plate member when said shell member is coupled to said plate member by said retention member.

14. A nut plate assembly in accordance with claim 1, wherein said shoulder portion extends axially toward said plate member, said bias member coupled between said plate member and said nut to bias said nut toward said shell member second end.

15. A nut plate assembly in accordance with claim 1, wherein said shoulder portion extends axially away from said plate member, said bias member coupled between said shell member second end and said nut to bias said nut toward said plate member.

16. A nut plate assembly comprising:
   a plate member comprising an aperture defined therethrough;
   a shell member comprising a cylindrical wall and having a first end coupled to said plate member and a second end opposite said first end, wherein the shell member is substantially cylindrical;
   a bias member disposed within said shell member; and
   a nut comprising a body including an outer surface defining a first diameter and a shoulder portion defining a second diameter, said body defining a bore having a threaded portion, said shoulder portion configured to receive a portion of said bias member, the second diameter defined by said shoulder portion is smaller than the first diameter defined by said outer surface to allow said bias member to extend along said shoulder portion and provide an axial force to said body, said nut disposed within said shell member and configured to move axially relative to said shell member between a first position proximate said shell member first end and a second position proximate said shell member second end, wherein said bias member is configured to bias said nut toward one of said first position and said second position.

17. A nut plate assembly in accordance with claim 16, wherein said cylindrical wall comprises a slot defined therethrough and extending axially between said first and second ends.

18. A nut plate assembly in accordance with claim 17 further comprising an anti-rotation pin coupled to said nut, said anti-rotation pin extending through said slot.

19. A nut plate assembly in accordance with claim 16, wherein said shoulder portion extends axially toward said plate member, said bias member coupled between said plate member and said nut to bias said nut toward said shell member second end.

20. A nut plate assembly in accordance with claim 16, wherein said shoulder portion extends axially away from said plate member, said bias member coupled between said shell member second end and said nut to bias said nut toward said plate member.

21. A nut plate assembly in accordance with claim 16, wherein said plate member comprises a plurality of retaining tabs engaging said shell member.

22. A nut plate assembly in accordance with claim 16, wherein said shell member comprises a flange at said shell member first end.

23. A nut plate assembly in accordance with claim 22, wherein said plate member comprises a plurality of retaining tabs bent over said flange to axially retain said shell member with respect to said plate member.

24. A nut plate assembly in accordance with claim 16 further comprising a fastener extending through said plate member and said nut, wherein said fastener is threadably engageable with said nut.

25. A fastener assembly comprising:
nut plate assembly adapted for mounting to a mounting structure, said nut plate assembly comprising:
   a plate member;
   a shell member comprising a first end coupled to said plate member and a second end opposite said first end;
   a nut disposed within said shell member, said nut moveable between a first position proximate said shell member first end and a second position proximate said shell member second end, said nut comprising a body including an outer surface defining a first diameter and a shoulder portion defining a second diameter, said body defining a bore having a threaded portion; and
   a bias member disposed within said shell member, said bias member configured to bias said nut toward one of said first position and said second position, wherein said shoulder portion is configured to receive a portion of said bias member, the second diameter defined by said shoulder portion is smaller than the first diameter defined by said outer surface to allow said bias member to extend along said shoulder portion and provide an axial force to said body; and
a fastener configured to mount in an aperture formed in a panel member, said fastener comprising a locking mechanism for retaining said fastener in said aperture, said fastener threadably engageable with said nut for coupling the panel member to the mounting structure.

26. A fastener assembly in accordance with claim 25, wherein said fastener comprises a groove, and said locking mechanism comprises a lock ring disposed within said groove.

27. A fastener assembly in accordance with claim 25, wherein said locking mechanism comprises one of a retaining ring, an E-clip, a spring plunger, and a lock ring.

28. A fastener assembly in accordance with claim 25, wherein said fastener comprises one of the following: a hexagonal head, a spline head, a flat head, a socket cap head, and a pan head.

29. A fastener assembly in accordance with claim 25, wherein said fastener is a locking fastener comprising at least one component configured to lock said fastener against rotation relative to the panel member.

* * * * *